US012734388B2

(12) United States Patent
Robin et al.

(10) Patent No.: US 12,734,388 B2
(45) Date of Patent: Sep. 15, 2026

(54) COMPOSITIONS AND USES OF TRANS-1,1,1,4,4,4-HEXAFLUORO-2-BUTENE AND 1,1-DIFLUOROETHANE (R-152A)

(71) Applicant: THE CHEMOURS COMPANY FC, LLC, Wilmington, DE (US)

(72) Inventors: Mark L. Robin, Middletown, DE (US); Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 331 days.

(21) Appl. No.: 18/662,270

(22) Filed: May 13, 2024

(65) Prior Publication Data

US 2024/0299793 A1 Sep. 12, 2024

Related U.S. Application Data

(60) Continuation of application No. 17/698,447, filed on Mar. 18, 2022, now Pat. No. 11,986,692, which is a division of application No. 16/910,118, filed on Jun. 24, 2020, now Pat. No. 11,311,761, which is a division of application No. 15/925,892, filed on Mar. 20, 2018, now abandoned.

(60) Provisional application No. 62/473,989, filed on Mar. 20, 2017.

(51) Int. Cl.

| | |
|---|---|
| ***A62D 1/00*** | (2006.01) |
| ***A01N 29/00*** | (2006.01) |
| ***A62D 1/02*** | (2006.01) |
| ***B01D 11/02*** | (2006.01) |
| ***C08J 9/14*** | (2006.01) |
| ***C09K 3/30*** | (2006.01) |
| ***C09K 5/00*** | (2006.01) |
| ***C09K 5/04*** | (2006.01) |
| ***C10M 105/04*** | (2006.01) |
| ***C10M 105/52*** | (2006.01) |
| ***C11D 7/50*** | (2006.01) |
| ***H01B 3/24*** | (2006.01) |
| ***H01B 3/56*** | (2006.01) |
| ***H05F 3/04*** | (2006.01) |

(52) U.S. Cl.

CPC .......... *A62D 1/0057* (2013.01); *A01N 29/00* (2013.01); *A62D 1/0071* (2013.01); *A62D 1/0092* (2013.01); *B01D 11/0288* (2013.01); *C08J 9/144* (2013.01); *C08J 9/146* (2013.01); *C09K 3/30* (2013.01); *C09K 5/00* (2013.01); *C09K 5/044* (2013.01); *C09K 5/045* (2013.01); *C09K 5/048* (2013.01); *C10M 105/04* (2013.01); *C10M 105/52* (2013.01); *C11D 7/5018* (2013.01); *H01B 3/24* (2013.01); *H01B 3/56* (2013.01); *H05F 3/04* (2013.01); *C08J 2203/162* (2013.01); *C08J 2203/182* (2013.01); *C08J 2203/202* (2013.01); *C08J 2367/00* (2013.01); *C09K 2205/12* (2013.01); *C09K 2205/126* (2013.01); *C09K 2205/24* (2013.01); *C09K 2205/32* (2013.01); *C10M 2203/045* (2013.01); *C10M 2211/0225* (2013.01)

(58) Field of Classification Search

None

See application file for complete search history.

(56) References Cited

U.S. PATENT DOCUMENTS

| | | | |
|---|---|---|---|
| 2,834,748 | A | 5/1958 | Bailey et al. |
| 2,846,458 | A | 8/1958 | Haluska |
| 2,917,480 | A | 12/1959 | Bailey et al. |
| 6,516,837 | B2 | 2/2003 | Thomas et al. |
| 6,589,355 | B1 | 7/2003 | Thomas et al. |
| 7,428,816 | B2 | 9/2008 | Singh |
| 7,569,170 | B2 | 8/2009 | Minor |
| 7,708,903 | B2 | 5/2010 | Sievert et al. |
| 7,825,081 | B2 | 11/2010 | Singh et al. |
| 2010/0163776 | A1 | 7/2010 | Robin |
| 2010/0243943 | A1 | 9/2010 | Robin |
| 2011/0144216 | A1 | 6/2011 | Hulse et al. |
| 2011/0220832 | A1 | 9/2011 | Robin |
| 2012/0117990 | A1 | 5/2012 | Rached et al. |
| 2013/0255284 | A1 | 10/2013 | Rached |
| 2014/0174084 | A1 | 6/2014 | Kontomaris |
| 2016/0068731 | A1 | 3/2016 | Minor et al. |
| 2016/0311961 | A1 | 10/2016 | Klostermann et al. |
| 2018/0264303 | A1 | 9/2018 | Robin et al. |
| 2020/0324156 | A1 | 10/2020 | Robin |

FOREIGN PATENT DOCUMENTS

| | | | |
|---|---|---|---|
| JP | 2014005418 | A | 1/2014 |
| WO | 2015077134 | A1 | 5/2015 |
| WO | 2017184975 | A1 | 10/2017 |

OTHER PUBLICATIONS

Ajavon, et al., World Meteorological Organization Global Ozone Research and Monitoring Project—Report No. 47, Scientific Assessment of Ozone Depletion, 2002.

D. W. Fahey, Twenty Questions and Answers About the Ozone Layer, Jun. 24-28, 2002, Les Diablerets, Switzerland.

Go Lu, et al., Anesthesia. XLI: The Anesthetic Properties of Certain Fluorinated Hydrocarbons and Ethers, 1953, pp. 466-472, vol. 14, Baltimore, Maryland.

*Primary Examiner* — Kristin A Vajda

(57) ABSTRACT

Disclosed is a mixture comprising the compound trans-1,1,1,4,4,4-hexafluoro-2-butene and 1,1-difluoroethane (R-152a). Also disclosed are methods of using and products of using the above compositions as blowing agents, solvents, heat transfer compositions, aerosol propellant compositions, fire extinguishing and suppressant compositions.

27 Claims, No Drawings

COMPOSITIONS AND USES OF TRANS-1,1,1,4,4,4-HEXAFLUORO-2-BUTENE AND 1,1-DIFLUOROETHANE (R-152A)

CROSS-REFERENCE TO RELATED APPLICATIONS

This is a Continuation of U.S. Non-Provisional application Ser. No. 17/698,447, filed Mar. 18, 2022, which is a Divisional of U.S. Non-Provisional Application Ser. No. 16/910,118, filed Jun. 24, 2020, which is a Divisional of U.S. Non-Provisional application Ser. No. 15/925,892, filed Mar. 20, 2018, which claims the benefit of U.S. Provisional No. 62/473,989, filed Mar. 20, 2017, the disclosure of which is incorporated herein by reference in its entirety.

BACKGROUND INFORMATION

Field of the Disclosure

This disclosure relates to compositions, methods and systems having utility in numerous applications, and in particular, uses for compositions containing the compound trans-1,1,1,4,4,4-hexafluoro-2-butene (E-HFO-1336mzz).

Description of the Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH{=}CHCF_3$, FC-1336mzz, HFO-1336mzz) is believed to meet both goals. 1,1,1,4,4,4-Hexafluoro-2-butene exists as two different stereoisomers, which have different boiling points, and therefore possibly perform differently in different applications.

SUMMARY

This invention relates to compositions, methods and systems having utility in numerous applications, and in particular, uses for compositions containing the compound trans-1,1,1,4,4,4-hexafluoro-2-butene (E-HFO-1336mzz), which has the following structure:

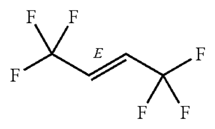

Embodiments of the present invention comprise the compound E-HFO-1336mzz, either alone or in combination with one or more other compounds as described in detail herein below. Mixtures containing the compound E-HFO-1336mzz can be azeotropic, azeotrope-like or non-azeotropic (zeotropic).

DETAILED DESCRIPTION

The compositions of the present invention all include the compound E-HFO-1336mzz. Certain embodiments of the invention, particularly those employed as blowing agent compositions or foamable compositions, can optionally include other ingredients, some of which are described in detail below.

In addition to the compound E-HFO-1336mzz, certain embodiments of the present invention are directed to compositions comprising, or consisting essentially of, at least one additional fluoroalkene containing from 2 to 6, preferably 3 to 5 carbon atoms, more preferably 3 to 4 carbon atoms, and in certain embodiments most preferably three carbon atoms, and at least one carbon-carbon double bond. The fluoroalkene compounds of the present invention are sometimes referred to herein for the purpose of convenience as hydrofluoro-olefins or "HFOs" if they contain at least one hydrogen.

Applicants have developed several compositions which include as an essential component the compound E-HFO-1336mzz and at least one additional compound such as HFOs, HFCs, hydrofluoroethers (HFEs), hydrocarbons, ethers, aldehydes, ketones, and others such as methyl formate, formic acid, trans-1,2-dichloroethylene (DCE), carbon dioxide (CO2), cis-HFO-1234ze+HFO-1225yez; mixtures of these plus water; mixtures of these plus CO2; mixtures of these plus DCE; mixtures of these plus methyl formate; mixtures with cis-HFO-1234ze+CO2; mixtures with cis-HFO-1234ze+HFO-1225yez+CO2; and mixtures with cis-HFO-1234ze+HFC-245fa. In such compositions, the amount of the compound E-HFO-1336mzz may vary widely, including in all cases constituting the balance of the composition after all other components in composition are accounted for.

In certain preferred embodiments, the amount of the compound E-HFO-1336mzz in the composition can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %.

The preferred compositions of the present invention are environmentally acceptable and do not contribute to the depletion of the earth's stratospheric ozone layer. The compounds and compositions of the present invention have no substantial ozone depletion potential (ODP), preferably an ODP of not greater than about 0.5 and even more preferably an ODP of not greater than about 0.25, most preferably an ODP of not greater than about 0.1; and/or a global warming potential (GWP) of not greater than about 150, and even more preferably, a GWP of not greater than about 50.

As used herein, ODP is defined in the "Scientific Assessment of Ozone Depletion, 2002," a report of the World Meteorological association, incorporated here by reference. As used herein, GWP is defined relative to that of carbon dioxide and over a 100 year time horizon, and defined in the same reference as for the ODP mentioned above.

Preferred compositions of this type are described below in Table 1 (with all percentages being in percent by weight and being understood to be proceeded by the word "about").

TABLE 1

| Blend Composition | | | |
|---|---|---|---|
| Compound Mixed with E-HFO-1336mzz | Preferred Ranges wt % | More Preferred Ranges wt % | Most Preferred Ranges wt % |
| HFOs | | | |
| HFO-1234ze (E&Z) | 1 to 99 | 5 to 95 | 10 to 90 |
| HFO-1234yf | 1 to 99 | 5 to 95 | 10 to 90 |
| HFO-1225ye (E&Z) | 1 to 99 | 5 to 95 | 10 to 90 |
| HFO-1225yc | 1 to 99 | 5 to 95 | 10 to 90 |
| HFO-1216 | 1 to 99 | 5 to 95 | 10 to 90 |
| HFO-1233zd (E&Z) | 1 to 99 | 5 to 95 | 10 to 90 |
| HFO-1233xf | 1 to 99 | 5 to 95 | 10 to 90 |
| HFO-1243zf | 1 to 99 | 5 to 95 | 10 to 90 |
| HFO-1336mzz (Z) | 1 to 99 | 5 to 95 | 10 to 90 |
| (CF3)2CFCH═CHF (E&Z) | 1 to 99 | 5 to 95 | 10 to 90 |
| (C2F5)(CF3)C═CH2 | 1 to 99 | 5 to 95 | 10 to 90 |
| (CF3)2CFCH═CF2 | 1 to 99 | 5 to 95 | 10 to 90 |
| (CF3)2CFCF═CHF (E&Z) | 1 to 99 | 5 to 95 | 10 to 90 |
| HFCs | | | |
| HFC-245fa | 1 to 99 | 5 to 95 | 10 to 90 |
| HFC-245cb | 1 to 99 | 5 to 95 | 10 to 90 |
| HFC-245ca | 1 to 99 | 5 to 95 | 10 to 90 |
| HFC-245eb | 1 to 99 | 5 to 95 | 10 to 90 |
| HFC-245ea | 1 to 99 | 5 to 95 | 10.to 90 |
| HFC-227ea | 1 to 99 | 5 to 95 | 10 to 90 |
| HFC-254eb | 1 to 99 | 5 to 95 | 10 to 90 |
| HFC-236ea | 1 to 99 | 5 to 95 | 10 to 90 |
| HFC-236fa | 1 to 99 | 5 to 95 | 10 to 90 |
| HFC-134 | 1 to 99 | 5 to 95 | 10 to 90 |
| HFC-134a | 1 to 99 | 5 to 95 | 10 to 90 |
| HFC-152 | 1 to 99 | 5 to 95 | 10 to 90 |
| HFC-152a | 1 to 99 | 5 to 95 | 10 to 90 |
| HFC-32 | 1 to 99 | 5 to 95 | 10 to 90 |
| HFC-125 | 1 to 99 | 5 to 95 | 10 to 90 |
| HFC-143a | 1 to 99 | 5 to 95 | 10 to 90 |
| HFC-365mfc | 1 to 99 | 5 to 95 | 10 to 90 |
| HFC-161 | 1 to 99 | 5 to 95 | 10 to 90 |
| HFC-43-10mee | 1 to 99 | 5 to 95 | 10 to 90 |
| HFC-23 | 1 to 99 | 5 to 95 | 10 to 90 |
| HFEs | | | |
| CHF2—O—CHF2 | 1 to 99 | 5 to 95 | 10 to 90 |
| CHF2—O—CH2F | 1 to 99 | 5 to 95 | 10 to 90 |
| CH2F—O—CH2F | 1 to 99 | 5 to 95 | 10 to 90 |
| CH2F—O—CH3 | 1 to 99 | 5 to 95 | 10 to 90 |
| cyclo-CF2—CH2—CF2—O | 1 to 99 | 5 to 95 | 10 to 90 |
| cyclo-CF2—CF2—CH2—O | 1 to 99 | 5 to 95 | 10 to 90 |
| CHF2—O—CF2—CHF2 | 1 to 99 | 5 to 95 | 10 to 90 |
| CF3—CF2—O—CH2F | 1 to 99 | 5 to 95 | 10 to 90 |
| CHF2—O—CHF—CF3 | 1 to 99 | 5 to 95 | 10 to 90 |
| CHF2—O—CF2—CHF2 | 1 to 99 | 5 to 95 | 10 to 90 |
| CH2F—O—CF2—CHF2 | 1 to 99 | 5 to 95 | 10 to 90 |
| CF3—O—CF2—CH3 | 1 to 99 | 5 to 95 | 10 to 90 |
| CHF2—CHF—O—CHF2 | 1 to 99 | 5 to 95 | 10 to 90 |

TABLE 1-continued

| Blend Composition | | | |
|---|---|---|---|
| Compound Mixed with E-HFO-1336mzz | Preferred Ranges wt % | More Preferred Ranges wt % | Most Preferred Ranges wt % |
| CF3—O—CHF—CH2F | 1 to 99 | 5 to 95 | 10 to 90 |
| CF3—CHF—O—CH2F | 1 to 99 | 5 to 95 | 10 to 90 |
| CF3—O—CH2—CHF2 | 1 to 99 | 5 to 95 | 10 to 90 |
| CHF2—O—CH2—CF3 | 1 to 99 | 5 to 95 | 10 to 90 |
| CH2F—CF2—O—CH2F | 1 to 99 | 5 to 95 | 10 to 90 |
| CHF2—O—CF2—CH3 | 1 to 99 | 5 to 95 | 10 to 90 |
| CHF2—CF2—O—CH3 | 1 to 99 | 5 to 95 | 10 to 90 |
| CH2F—O—CHF—CH2F | 1 to 99 | 5 to 95 | 10 to 90 |
| CHF2—CHF—O—CH2F | 1 to 99 | 5 to 95 | 10 to 90 |
| CF3—O—CHF—CH3 | 1 to 99 | 5 to 95 | 10 to 90 |
| CF3—CHF—O—CH3 | 1 to 99 | 5 to 95 | 10 to 90 |
| CHF2—O—CH2—CHF2 | 1 to 99 | 5 to 95 | 10 to 90 |
| CF3—O—CH2—CH2F | 1 to 99 | 5 to 95 | 10 to 90 |
| CF3—CH2—O—CH2F | 1 to 99 | 5 to 95 | 10 to 90 |
| CF2H—CF2—CF2—O—CH3 | 1 to 99 | 5 to 95 | 10 to 90 |
| Hydrocarbons | | | |
| propane | 1 to 99 | 5 to 95 | 10 to 90 |
| butane | 1 to 99 | 5 to 95 | 10 to 90 |
| isobutane | 1 to 99 | 5 to 95 | 10 to 90 |
| n-pentane (high HFO) | 1 to 99 | 50 to 99 | 60 to 99 |
| n-pentane (high n-pentane) | 1 to 99 | 1 to 30 | 1 to 20 |
| isopentane (high HFO) | 1 to 99 | 50 to 99 | 60 to 90 |
| isopentane (high isopentane) | 1 to 99 | 1 to 30 | 1 to 20 |
| neopentane (high HFO) | 1 to 99 | 50 to 99 | 60 to 99 |
| neopentane (high neopentane) | 1 to 99 | 1 to 30 | 1 to 20 |
| cyclopentane (high HFO) | 1 to 99 | 50 to 99 | 60 to 99 |
| cyclopentane (high cyclopentane) | 1 to 99 | 1 to 30 | 1 to 20 |
| n-hexane | 1 to 99 | 5 to 95 | 10 to 90 |
| isohexane | 1 to 99 | 5 to 95 | 10 to 90 |
| heptane | 1 to 99 | 5 to 95 | 10 to 90 |
| Ethers | | | |
| dimethyl ether | 1 to 99 | 5 to 95 | 10 to 90 |
| methylethyl ether | 1 to 99 | 5 to 95 | 10 to 90 |
| diethyl ether | 1 to 99 | 5 to 95 | 10 to 90 |
| methylpropyl ether | 1 to 99 | 5 to 95 | 10 to 90 |
| methylisopropyl ether | 1 to 99 | 5 to 95 | 10 to 90 |
| ethylpropyl ether | 1 to 99 | 5 to 95 | 10 to 90 |
| ethylisopropyl ether | 1 to 99 | 5 to 95 | 10 to 90 |
| dipropyl ether | 1 to 99 | 5 to 95 | 10 to 90 |
| diisopropyl ether | 1 to 99 | 5 to 95 | 10 to 90 |
| dimethoxymethane | 1 to 99 | 5 to 95 | 10 to 90 |
| diethoxymethane | 1 to 99 | 5 to 95 | 10 to 90 |
| dipropoxymethane | 1 to 99 | 5 to 95 | 10 to 90 |
| dibutoxymethane | 1 to 99 | 5 to 95 | 10 to 90 |
| Aldehydes | | | |
| formaldehyde | 1 to 99 | 5 to 95 | 10 to 90 |
| acetaldehyde | 1 to 99 | 5 to 95 | 10 to 90 |
| propanal | 1 to 99 | 5 to 95 | 10 to 90 |
| butanal | 1 to 99 | 5 to 95 | 10 to 90 |
| isobutanal | 1 to 99 | 5 to 95 | 10 to 90 |
| Ketones | | | |
| Acetone | 1 to 99 | 5 to 95 | 10 to 90 |
| Methylethylketone | 1 to 99 | 5 to 95 | 10 to 90 |
| methylisobutylketone | 1 to 99 | 5 to 95 | 10 to 90 |
| perfluoroethylisopropylketone (C2F5C(O)CF(CF3)2 | 1 to 99 | 5 to 95 | 10 to 90 |
| Others | | | |
| water | 1 to 99 | 5 to 95 | 10 to 90 |
| methyl formate | 1 to 99 | 5 to 95 | 10 to 90 |
| ethyl formate | 1 to 99 | 5 to 95 | 10 to 90 |
| formic acid | 1 to 99 | 5 to 95 | 10 to 90 |
| trans-1,2-dichloroethylene (t-DCE) | 1 to 99 | 5 to 95 | 10 to 90 |
| $CO_2$ | 1 to 99 | 5 to 95 | 10 to 90 |
| HCFO-1232xf | 1 to 99 | 5 to 95 | 10 to 90 |
| HCFO-1223xd | 1 to 99 | 5 to 95 | 10 to 90 |
| HCFO-1233xf | 1 to 99 | 5 to 95 | 10 to 90 |
| HCFO-1233zd (E&Z) | 1 to 99 | 5 to 95 | 10 to 90 |
| HCFO-1224yd (E&Z) | 1 to 99 | 5 to 95 | 10 to 90 |

TABLE 1-continued

| Blend Composition | | | |
|---|---|---|---|
| Compound Mixed with E-HFO-1336mzz | Preferred Ranges wt % | More Preferred Ranges wt % | Most Preferred Ranges wt % |
| CFC-13 (CF3Cl) | 1 to 99 | 5 to 95 | 10 to 90 |
| HCFO-1121a (CHF=CCl2) | 1 to 99 | 5 to 95 | 10 to 90 |
| HCFO-1121 (CFCl=CHCl) | 1 to 99 | 5 to 95 | 10 to 90 |
| HCFO-1131a (CH2=CFCl) | 1 to 99 | 5 to 95 | 10 to 90 |
| HCFO-1131 (CHF=CHCl) | 1 to 99 | 5 to 95 | 10 to 90 |
| HCFO-1122 (CF2=CHCl) | 1 to 99 | 5 to 95 | 10 to 90 |
| HCFO-1113 (CF2=CFCl) | 1 to 99 | 5 to 95 | 10 to 90 |
| CH2=CHCl | 1 to 99 | 5 to 95 | 10 to 90 |
| CH3Cl | 1 to 99 | 5 to 95 | 10 to 90 |
| HCFC-133a (CF3CH2Cl) | 1 to 99 | 5 to 95 | 10 to 90 |
| CFC-115 (CF3CF2Cl) | 1 to 99 | 5 to 95 | 10 to 90 |
| 3,3,3-Trifluoropropyne | 1 to 99 | 5 to 95 | 10 to 90 |
| HCFC-124 (CF3CHFCl) | 1 to 99 | 5 to 95 | 10 to 90 |
| HCC-40 (CH3Cl) | 1 to 99 | 5 to 95 | 10 to 90 |
| HCFC-22 (CF2HCl) | 1 to 99 | 5 to 95 | 10 to 90 |
| cis-HFO-1234ze + HFO-1225yeZ | 1 to 99 | 5 to 95 | 10 to 90 |
| Mixtures of any of the above plus water | 1 to 99% H2O | 5 to 95% H2O | 10 to 90% H2O |
| Mixtures of any of the above plus CO2 | 1 to 99% CO2 | 5 to 95% CO2 | 10 to 90% CO2 |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO2 | 1 to 99 | 5 to 95 | 10 to 90 |
| Mixtures with cis-HFO-1234ze + CO2 + 1225yeZ | 1 to 99 | 5 to 95 | 10 to 90 |
| Mixtures with cis-HFO-1234ze + HFC-245fa | 1 to 99 | 5 to 95 | 10 to 90 |

Azeotrope Compositions

Some of the compositions of E-HFO-1336mzz have been formed to form azeotropic or azeotrope-like compositions with some blend components.

As used herein, an azeotropic composition is a constant boiling liquid admixture of two or more substances wherein the admixture distills without substantial composition change and behaves as a constant boiling composition. Constant boiling compositions, which are characterized as azeotropic, exhibit either a maximum or a minimum boiling point, as compared with that of the non-azeotropic mixtures of the same substances. Azeotropic compositions as used herein include homogeneous azeotropes which are liquid admixtures of two or more substances that behave as a single substance, in that the vapor, produced by partial evaporation or distillation of the liquid, has the same composition as the liquid. Azeotropic compositions as used herein also include heterogeneous azeotropes where the liquid phase splits into two or more liquid phases. In these embodiments, at the azeotropic point, the vapor phase is in equilibrium with two liquid phases and all three phases have different compositions. If the two equilibrium liquid phases of a heterogeneous azeotrope are combined and the composition of the overall liquid phase calculated, this would be identical to the composition of the vapor phase.

For the purpose of this discussion, near-azeotropic composition means a composition that behaves like an azeotrope (i.e., has constant boiling characteristics or a tendency not to fractionate upon boiling or evaporation). Thus, the composition of the vapor formed during boiling or evaporation is the same as or substantially the same as the original liquid composition. Hence, during boiling or evaporation, the liquid composition, if it changes at all, changes only to a minimal or negligible extent. This is to be contrasted with non-azeotropic compositions in which during boiling or evaporation, the liquid composition changes to a substantial degree.

Near-azeotropic compositions exhibit dew point pressure and bubble point pressure with virtually no pressure differential. That is to say that the difference in the dew point pressure and bubble point pressure at a given temperature will be a small value. It may be stated that compositions with a difference in dew point pressure and bubble point pressure of less than or equal to 3 percent (based upon the bubble point pressure) may be considered to be a near-azeotropic.

It is also recognized that both the boiling point and the weight percentages of each component of the azeotropic or near-azeotropic liquid composition may change when the azeotropic or near-azeotropic liquid composition is subjected to boiling at different pressures. Thus, an azeotropic or a near-azeotropic composition may be defined in terms of the unique relationship that exists among the components or in terms of the compositional ranges of the components or in terms of exact weight percentages of each component of the composition characterized by a fixed boiling point at a specified pressure. It is also recognized in the art that various azeotropic compositions (including their boiling points at particular pressures) may be calculated (see, e.g., W. Schotte Ind. Eng. Chem. Process Des. Dev. (1980) 19, 432-439). Experimental identification of azeotropic compositions involving the same components may be used to confirm the accuracy of such calculations and/or to modify the calculations at the same or other temperatures and pressures.

In one embodiment, the present inventors have determined that E-1336mzz forms azeotropic compositions with cyclopentane. In one embodiment, these include compositions comprising from about 89.6 mole percent to about 97.8 mole percent E-1336mzz and from about 2.2 mole percent to about 10.4 mole percent cyclopentane (which forms an azeotrope boiling at a temperature from between about −40° C. and about 60° C. and at a pressure of from between about 1.43 psia and about 83.12 psia).

In another embodiment, compositions may be formed that consist essentially of E-1336mzz and cyclopentane. These include compositions consisting essentially of from about 89.6 mole percent to about 97.8 mole percent E-1336mzz and from about 2.2 mole percent to about 10.4 mole percent cyclopentane (which forms an azeotrope boiling at a temperature from between about −40° C. and about 60° C. and at a pressure of from between about 1.43 psia and about 83.12 psia).

In yet another embodiment, near-azeotropic compositions comprising E-1336mzz and cyclopentane may also be formed. Such near-azeotopic compositions comprise from about 82.4 mole percent to about 99.8 mole percent E-1336mzz and from about 0.2 mole percent to about 17.6 mole percent cyclopentane at temperatures ranging from about −40° C. to about 100° C.

In yet another embodiment, near-azeotropic compositions consisting essentially of E-1336mzz and cyclopentane may also be formed. Such near-azeotopic compositions consist essentially of from about 82.4 mole percent to about 99.8 mole percent E-1336mzz and from about 0.2 mole percent to about 17.6 mole percent cyclopentane at temperatures ranging from about −40° C. to about 100° C.

At one atmosphere pressure the composition of the azeotropic composition comprise about 90 mole percent E-1336mzz and about 10 mole percent cyclopentane, which exhibits a normal boiling point of 6.8° C.

Uses of the Compositions

As described above, the compositions of the present invention may be used in a wide variety of applications as substitutes for CFCs and for compositions containing less desirable HCFCs. For example, the present compositions are useful as blowing agents, refrigerants, heating agents, power cycle agents, cleaning agents, aerosol propellants, sterilization agents, lubricants, flavor and fragrance extractants, flammability reducing agents, and flame suppression agents, to name a few preferred uses. Each of these uses will be discussed in greater detail below.

Blowing Agents

Thus, the present invention includes methods and systems which include using E-HFO-1336mzz as a blowing agent, optionally with one or more optional additional compounds which include, but are not limited to, other compounds which also act as blowing agents (hereinafter referred to for convenience but not by way of limitation as co-blowing agents), surfactants, polyols, catalysts, flame retardants, polymer modifiers, colorants, dyes, solubility enhancers, rheology modifiers, plasticizing agents, fillers, nucleating agents, viscosity reduction agents, vapor pressure modifiers, stabilizers, and the like. Preferred blends for blowing agents used for foams, especially spray foams and panel foams include blends of E-HFO-1336mzz with hydrocarbons (especially the pentanes, including cyclopentane), and with each of HFC-245fa, HFC-365mfc, HCFO-1233zd and HCFO-1224 yd. While the cis isomer of HFO-1336mzz is preferred, it is anticipated that the trans isomer and/or mixtures of the isomers, including the racemate, will be useful in certain foam types.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

In certain preferred embodiments, dispersing agents, cell stabilizers, surfactants and other additives may also be incorporated into the blowing agent compositions of the present invention. Certain surfactants are optionally but preferably added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458, each of which is incorporated herein by reference. Other optional additives for the blowing agent mixture may include flame retardants such as tris(2-chloroethyl)phosphate, tris(2-chloropropyl)phosphate, tris(2,3-dibromopropyl)-phosphate, tris (1,3-dichloro-propyl)phosphate, diammonium phosphate, various halogenated aromatic compounds, antimony oxide, aluminum trihydrate, polyvinyl chloride, and the like. With respect to nucleating agents, all known compounds and materials having nucleating functionality are available for use in the present invention, including particularly talc.

Of course other compounds and/or components that modulate a particular property of the compositions (such as cost for example) may also be included in the present compositions, and the presence of all such compounds and components is within the broad scope of the invention.

The co-blowing agent in accordance with the present invention can comprise a physical blowing agent, a chemical blowing agent (which preferably in certain embodiments comprises water) or a blowing agent having a combination of physical and chemical blowing agent properties.

Although it is contemplated that a wide range of co-blowing agents may be used in accordance with the present invention, in certain embodiments it is preferred that the blowing agent compositions of the present invention include one or more HFCs as co-blowing agents, more preferably one or more C1-C4 HFCs, and/or one or more hydrocarbons, more preferably C4-C6 hydrocarbons. For example, with respect to HFCs, the present blowing agent compositions may include one or more of difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227), pentafluorobutane (HFC-365), hexafluorobutane (HFC-356) and all isomers of all such HFC's.

With respect to hydrocarbons, the present blowing agent compositions may include in certain preferred embodiments, for example, iso, normal and/or cyclopentane for thermoset foams and butane or isobutane for thermoplastic foams. Of course other materials, such as water, CO2, CFCs (such as trichlorofluoromethane (CFC-11) and dichlorodifluoromethane (CFC-12), hydrochlorocarbons (HCCs such as dichloroethylene (preferably trans-1,2-dichloroethylene), ethyl chloride and chloropropane), HCFCs, C1-C5 alcohols (such as, for example, ethanol and/or propanol and/or butanol), C1-C4 aldehydes, C1-C4 ketones, C1-C4 ethers (including ethers (such as dimethyl ether and diethyl ether), diethers (such as dimethoxy methane and diethoxy methane), and methyl formate including combinations of any of these may be included, although such components are contemplated to be not preferred in many embodiments due to negative environmental impact.

In certain embodiments, one or more of the following HFC isomers are preferred for use as co-blowing agents in the compositions of the present invention:

1,1,1,2,2-pentafluoroethane (HFC-125)
1,1,2,2-tetrafluoroethane (HFC-134)
1,1,1,2-tetrafluoroethane (HFC-134a)
1,1-difluoroethane (HFC-152a)
1,1,1,2,3,3,3-heptafluoropropane (HFC-227 ea)
1,1,1,3,3,3-hexafluoropropane (HFC-236fa)
1,1,1,3,3-pentafluoropropane (HFC-245 fa) and
1,1,1,3,3-pentafluorobutane (HFC-365mfc).

The relative amount of any of the above noted additional co-blowing agents, as well as any additional components which may be included in present compositions, can vary widely within the general broad scope of the present invention according to the particular application for the composition, and all such relative amounts are considered to be within the scope hereof.

In certain embodiments it is preferred that the blowing agent composition of the present invention comprise at least one co-blowing agent and an amount of E-HFO-1336mzz sufficient to produce a blowing agent composition which is overall nonflammable.

The blowing agent compositions of the present invention may include the compound E-HFO-1336mzz in widely ranging amounts. It is generally preferred, however, that for preferred compositions for use as blowing agents in accordance with the present invention, E-HFO-1336mzz is present in an amount that is at least about 1% by weight, more preferably at least about 5% by weight, and even more preferably at least about 15% by weight, of the composition.

In certain preferred embodiments, the blowing agent comprises at least about 50% by weight of the present blowing agent compound(s), and in certain embodiments the blowing agent consists essentially of E-HFO-1336mzz. In this regard, it is noted that the use of one or more co-blowing agents is consistent with the novel and basic features of the present invention. For example, it is contemplated that water will be used as either a co-blowing or in combination with other co-blowing agents (such as, for example, pentane, particularly cyclopentane) in a large number of embodiments.

In certain preferred embodiments, the blowing agent composition comprises from about 30% to about 95% by weight of E-HFO-1336mzz and from about 5% to about 90% by weight, more preferably from about 5% to about 65% by weight of co-blowing agent. In certain of such embodiments the co-blowing agent comprises, and preferably consists essentially of, H2O, HFCs, hydrocarbons, alcohols (preferably C2, C3 and/or C4 alcohols), CO2, and combinations of these.

In preferred embodiments in which the co-blowing agent comprises H2O, the composition comprises H2O in an amount of from about 5% by weight to about 50% by weight of the total blowing agent composition, more preferably from about 10% by weight to about 40% by weight, and even more preferably of from about 10% to about 20% by weight of the total blowing agent.

In preferred embodiments in which the co-blowing agent comprises CO2, the composition comprises CO2 in an amount of from about 5% by weight to about 60% by weight of the total blowing agent composition, more preferably from about 20% by weight to about 50% by weight, and even more preferably of from about 40% to about 50% by weight of the total blowing agent.

In preferred embodiments in which the co-blowing agent comprises alcohols, (preferably C2, C3 and/or C4 alcohols), the composition comprises alcohol in an amount of from about 5% by weight to about 40% by weight of the total blowing agent composition, more preferably from about 10% by weight to about 40% by weight, and even more preferably of from about 15% to about 25% by weight of the total blowing agent.

For compositions which include HFC co-blowing agents, the HFC co-blowing agent (preferably C2, C3, C4 and/or C5 HFC), and even more preferably difluoroethane (HFC-152a being particularly preferred for extruded thermoplastics) and/or pentafluoropropane (HFC-245)), is preferably present in the composition in amounts of from of from about 5% by weight to about 80% by weight of the total blowing agent composition, more preferably from about 10% by weight to about 75% by weight, and even more preferably of from about 25% to about 75% by weight of the total blowing agent. Furthermore, in such embodiments, the HFC is preferably C2-C4 HFC, and even more preferably C3 HFC, with penta-fluorinated C3 HFC, such as HFC-245fa, being highly preferred in certain embodiments.

For compositions which include HC co-blowing agents, the HC co-blowing agent (preferably C3, C4 and/or C5 HC) is preferably present in the composition in amounts of from of from about 5% by weight to about 80% by weight of the total blowing agent composition, and even more preferably from about 20% by weight to about 60% by weight of the total blowing agent.

Blowing Agent Examples

Example 1—Foaming Using Z-1,1,1,4,4,4-hexafluoro-2-butene and E-1,1,1,4,4,4-hexafluoro-2-butene Mixtures as the Blowing Agent The foaming was carried out at 1000 psi (6.9 MPa) sprayer gauge pressure using different mixtures of these blowing agents and at different foaming temperatures. The results are reported in Table 2.

TABLE 2

Use of Mixtures of the Z- and E-Isomers as Blowing Agent

| Isomer Mixture, % | Foaming Temp (° F.) | Density (PCF) | Thermal Conductivity (BTU-in/hr-ft$^2$-° F.) |
|---|---|---|---|
| 40Z/60E | poor quality foam | — | — |
| 50Z/50E | poor quality foam | — | — |
| 60Z/40E | 100 | 2.46 | 0.1593 (5.57) |
| 60Z/40E | 140 | 2.63 | 0.1553 (5.43) |
| 70Z/30E | 100 | 2.51 | 0.1555 (5.44) |
| 70Z/30E | 140 | 2.73 | 0.1559 (5.45) |
| 80Z/20E | 100 | 2.86 | 0.1654 (5.78) |

The numerical amounts of Z and E in the Isomer mixture column are the wt % s of the isomer in the mixture. Thus, isomer mixture Z40/E60 means the mixture is 40 wt % Z-isomer and 60 wt % E-isomer. The poor quality of the sprayed foam for the 40Z/60E and 50Z/50E compositions is exhibited by the foam structure being frothy, i.e. exhibiting large open cells, and non-uniform foam structure across the thickness of the foamed structure. In contrast, the remaining blowing agents in Table 2 produced sprayed foams of the same thickness as the poor quality foams, but exhibiting no frothing, uniform density across the foam structure thickness, and an average of at least 95% closed cell. The units of thermal conductivity are the same as in Table 1. The k-factors in parentheses are values X10-5. The temperature at which thermal conductivity is measured is 75° F.

The results in Table 2 reveal that greater than 50 wt % of the Z-isomer is required in the mixture with the E-isomer and that 80 wt % Z isomer is too much. The results also reveal that the thermal conductivity is not appreciably changed over this broad foaming temperature range. The change for the 60Z-40E mixture is 2.6% (calculation: (0.1593-0.01553)×100)). The change for the 70Z/30E mixture is 0.3%. This enables foam applicators broad discretion in the choice of foaming application without sacrifice in foam quality, and/or permits quality foaming application when the equipment temperature is in error.

The A-side composition used in the Comparison Example and in Example 1 was a polymeric aromatic isocyanate with an —NCO content of 31.5 wt % and a viscosity of 200 cps at 25° C., present in an amount sufficient for index of 105-110.

The B-side composition used in Example 1 is set forth in Table 3.

TABLE 3

| B-Side Composition Ingredient |
|---|
| Polyester polyol |
| Mannich polyol |
| Ethylamine, 2'2-oxybis[N,N-dimethyl—catalyst |
| 2(-N,N-dimethylaminoethyl-N-methylamino)ethanol catalyst |
| 1.3-propanediamine, N-[3-dimethylamino)propyl]-N,N',N'-Trimethyl—catalyst |
| 2-butoxy ethanol co-solvent |
| Tris(chloropropyl) phosphate (TCPP) |
| Glycerin |
| Silicone surfactant |
| Water |
| Z/E isomer mixture (Table 2) |
| Total |

The polyester polyol has a hydroxyl number of 307 mg KOH/g, nominal functionality of 2.2, and dynamic viscosity of 5500 cps at 25° C.

The Mannich polyol has a hydroxyl number of 470 mg KOH/g, nominal functionality of 4, and dynamic viscosity of 10000 cps at 25° C.

Example 2—Solubility of Blowing Agent in Polyol of B-side

E-1,1,1,4,4,4-hexafluoro-2-butene has a boiling temperature of 7.5° F. (1 atm) and causes the polyisocyanate/polyol reaction product to froth uncontrollably when the E-isomer is used by itself as the blowing agent, which disrupts the spray pattern when this method of application is used. This disruption of the spray pattern causes the deposited foamed structure to exhibit a rough exterior surface arising from expansion of the E-isomer that is not dissolved in the polyol of the B-side composition. A "frothed" foam lacks integrity by being easily collapsed. A comparison of solubilities when the E-isomer is the only blowing agent and when 10 wt % (based on the weight of the polyol of the B-side composition) of the Z-isomer is supplemented by the E-isomer is presented in Table 4.

TABLE 4

Comparison of Solubilities of Blowing Agent in Polyol of B-side Composition

| Blowing Agent | E-Isomer Solubility in Polyol (wt %) |
|---|---|
| E-isomer | less than 1.48 |
| E-isomer/10 wt % Z-isomer | 6.11 |

As shown in Table 4, the E-isomer by itself has very low solubility in the polyol of the B-side composition, and this solubility is improved by adding the indicated amount of the Z-isomer to the polyol of the B-side composition. The improvement in solubility using the Z-isomer addition is greater than 400%. The combination of the 10 wt % Z-isomer and 6.11 wt % E-isomer dissolved in the polyol of the B-side composition corresponds to a blowing agent composition of 62.5 wt % Z-isomer and 37.5 wt % E-isomer.

The low boiling temperature of 7.5° F. for the E-isomer together with its low ODP and GWP make this isomer an attractive candidate as blowing agent for the polyisocyanate/polyol reaction product. The uncontrolled frothing of the reaction product caused by the insolubility of the E-isomer limits the use of the E-isomer for this purpose. The solubilization of the E-isomer by the presence of the Z-isomer as described above enables the E-isomer to be advantageously be used in the spray application foaming of the polyisocyanate/polyol reaction product without the detriment of uncontrolled frothing. Advantages include improvement in the foaming process and in the performance of the resultant foamed reaction product.

An example of the B-side composition which contains the polyol used in the solubility test is presented in Table 5.

TABLE 5

B-side Composition

| Ingredient | Wt % |
|---|---|
| Polyester polyol (same as Table 3) | 35.00 |
| Mannich polyol | 32.30 |
| Catalyst: 2-{[2-(dimethylamino)ethyl] methylamino}ethanol | 1.90 |
| Catalyst: bis(dimetylaminoethyl)ether | 0.10 |
| Catalyst: 2-{[2-(dimethylamino)ethyl]methylamino}ethanol | 0.23 |
| Silicone surfactant | 1.10 |
| Tris(chloropropyl) phosphate (TCPP) | 15.40 |
| Water | 1.70 |
| Blowing agent (Table 3) | 12.25 |
| Total | 100.00 |

The Mannich polyol has a hydroxyl number of 425 mg KOH/g, a nominal functionality of 3.2, and a dynamic viscosity of 4500 cps at 25° C.

The procedure for determining solubility (under ambient conditions—temperature of 15° C. to 25° C. and atmospheric pressure) is as follows: 50.000 g of the polyol is added to a tared, 120 ml aerosol flask and weighed. Then, in small increments, the blowing agent is introduced via the gas inlet and the contents are mixed thoroughly then allowed to stand. When both isomers are used, they are introduced sequentially: first 5.0 g of the Z-isomer, followed by increments of the E-isomer until 2 phase behavior is first observed, indicating the limit of solubility of the E-isomer in the polyol. The addition of the 5.0 g of Z-isomer to the polyol forms a single phase, indicating complete solubility of this proportion (10 wt %) of the Z-isomer in the polyol. The total weight of E-isomer present in and thus dissolved in the single phase is the weight gain over the combination of 50.000 g of polyol and 5.0 g of Z-isomer in the single phase. The 6.11 wt % E-isomer reported in Table 4 is the amount of dissolved E-isomer compared to the 50.000 g of polyol. On this basis, the polyol contains in solution 10 wt % of the Z isomer and 6.11 w % of the E-isomer.

The mixture of the Z-isomer with the E-isomer has the effect of minimizing/controlling to eliminating the frothing associated with the E-isomer when used by itself in spray application and providing certain blowing agent mixtures that exhibit foaming insensitivity to produce high quality foams over a wide range of elevated foaming temperatures.

Foamable Compositions

One embodiment of the present invention provides foamable compositions. As is known to those skilled in the art, foamable compositions generally include one or more components capable of forming foam. As used herein, the term "foam foaming agent" is used to refer to a component, or a combination on components, which are capable of forming a foam structure, preferably a generally cellular foam structure. The foamable compositions of the present invention include such component(s) and a blowing agent compound, preferably E-HFO-1336mzz.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

In certain embodiments, the one or more components capable of forming foam comprise a thermosetting composition capable of forming foam and/or foamable compositions. Examples of thermosetting compositions include polyurethane and polyisocyanurate foam compositions, and also phenolic foam compositions. This reaction and foaming process may be enhanced through the use of various additives such as catalysts and surfactant materials that serve to control and adjust cell size and to stabilize the foam structure during formation. Furthermore, it is contemplated that any one or more of the additional components described above with respect to the blowing agent compositions of the present invention could be incorporated into the foamable composition of the present invention. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

In certain other embodiments of the present invention, the one or more components capable of foaming comprise thermoplastic materials, particularly thermoplastic polymers and/or resins. Examples of thermoplastic foam components include polyolefins, such as for example monovinyl aromatic compounds of the formula Ar—CH═CH2 wherein Ar is an aromatic hydrocarbon radical of the benzene series such as polystyrene (PS). Other examples of suitable polyolefin resins in accordance with the invention include the various ethylene resins including the ethylene homopolymers such as polyethylene and ethylene copolymers, polypropylene (PP) and polyethylene-terephthalate (PET). In certain embodiments, the thermoplastic foamable composition is an extrudable composition.

It is contemplated that all presently known and available methods and systems for forming foam are readily adaptable for use in connection with the present invention. For example, the methods of the present invention generally require incorporating a blowing agent in accordance with the present invention into a foamable or foam forming composition and then foaming the composition, preferably by a step or series of steps which include causing volumetric expansion of the blowing agent in accordance with the present invention.

In general, it is contemplated that the presently used systems and devices for incorporation of blowing agent and for foaming are readily adaptable for use in accordance with the present invention. In fact, it is believed that one advantage of the present invention is the provision of an improved blowing agent which is generally compatible with existing foaming methods and systems.

Thus, it will be appreciated by those skilled in the art that the present invention comprises methods and systems for foaming all types of foams, including thermosetting foams, thermoplastic foams and formed-in-place foams. Thus, one aspect of the present invention is the use of the present blowing agents in connection with conventional foaming equipment, such as polyurethane foaming equipment, at conventional processing conditions. The present methods therefore include polyol premix type operations, blending type operations, third stream blowing agent addition, and blowing agent addition at the foam head.

With respect to thermoplastic foams, the preferred methods generally comprise introducing a blowing agent in accordance with the present invention into a thermoplastic material, preferably thermoplastic polymer such as polyolefin, and then subjecting the thermoplastic material to conditions effective to cause foaming. For example, the step of introducing the blowing agent into the thermoplastic material may comprise introducing the blowing agent into a screw extruder containing the thermoplastic, and the step of causing foaming may comprise lowering the pressure on the thermoplastic material and thereby causing expansion of the blowing agent and contributing to the foaming of the material.

It will be appreciated by those skilled in the art, especially in view of the disclosure contained herein, that the order and manner in which the blowing agent of the present invention is formed and/or added to the foamable composition does not generally affect the operability of the present invention. For example, in the case of extrudable foams, it is possible that the various components of the blowing agent, and even the components of the foamable composition, be not be mixed in advance of introduction to the extrusion equipment, or even that the components are not added to the same location in the extrusion equipment. Moreover, the blowing agent can be introduced either directly or as part of a premix, which is then further added to other parts of the foamable composition.

Thus, in certain embodiments it may be desired to introduce one or more components of the blowing agent at first location in the extruder, which is upstream of the place of addition of one or more other components of the blowing agent, with the expectation that the components will come together in the extruder and/or operate more effectively in this manner. Nevertheless, in certain embodiments, two or more components of the blowing agent are combined in advance and introduced together into the foamable composition, either directly or as part of premix which is then further added to other parts of the foamable composition.

Foams

One embodiment of the present invention relates to methods of forming foams, especially panel foams and spray foams, and preferably such foams made from polyurethane and polyisocyanurate. The methods generally comprise providing a blowing agent composition of the present inventions, adding (directly or indirectly) the blowing agent composition to a foamable composition, and reacting the foamable composition under the conditions effective to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives.

It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as one or more additional streams to the mix head or reaction site. Most preferably, however, they are all incorporated into one B-component as described above.

The present methods and systems also include forming a one component foam, preferably polyurethane foam, containing a blowing agent in accordance with the present invention. In certain preferably embodiments, a portion of the blowing agent is contained in the foam forming agent, preferably by being dissolved in a foam forming agent which is liquid at the pressure within the container, a second portion of the blowing agent is present as a separate gas phase. In such systems, the contained/dissolved blowing agent performs, in large part, to cause the expansion of the foam, and the separate gas phase operates to impart propulsive force to the foam forming agent.

Such one component systems are typically and preferably packaged in a container, such as an aerosol type can, and the blowing agent of the present invention thus preferably provides for expansion of the foam and/or the energy to transport the foam/foamable material from the package, and preferably both. In certain embodiments, such systems and methods comprise charging the package with a fully formulated system (preferably isocyanate/polyol system) and incorporating a gaseous blowing agent in accordance with the present invention into the package, preferably an aerosol type can.

It is contemplated also that in certain embodiments it may be desirable to utilize the present compositions when in the supercritical or near supercritical state as a blowing agent.

The present invention also relates to all foams, including but not limited to closed cell foam, open cell foam, spray foams, panel foams, rigid foam, flexible foam, integral skin and the like, prepared from a polymer foam formulation containing a blowing agent comprising, or consisting essentially of, E-HFO-1336mzz, either alone or in combination with one or more other compounds.

Applicants have found that one advantage of the foams, and particularly thermoset foams such as polyurethane foams, in accordance with the present invention is the ability to achieve, preferably in connection with thermoset foam embodiments, exceptional thermal performance, such as can be measured by the K-factor or lambda, particularly and preferably under low temperature conditions, as shown in FIG. 1. Although it is contemplated that the present foams, particularly thermoset foams of the present invention, may be used in a wide variety of applications, in certain preferred embodiments the present invention comprises appliance foams in accordance with the present invention, including refrigerator foams, freezer foams, refrigerator/freezer foams, panel foams, and other cold or cryogenic manufacturing applications.

The foams in accordance with the present invention, in certain preferred embodiments, provide one or more exceptional features, characteristics and/or properties, including: thermal insulation efficiency (particularly for thermoset foams), dimensional stability, compressive strength, aging of thermal insulation properties, all in addition to the low ozone depletion potential and low global warming potential associated with many of the preferred blowing agents of the present invention. In certain highly preferred embodiments, the present invention provides thermoset foam, including such foam formed into foam articles, which exhibit improved thermal conductivity relative to foams made using the same blowing agent (or a commonly used blowing agent such as HFC-245fa) in the same amount but without the compound E-HFO-1336mzz.

In other preferred embodiments, the present foams exhibit improved mechanical properties relative to foams produced with blowing agents outside the scope of the present invention. For example, certain preferred embodiments of the present invention provide foams and foam articles having a compressive strength which is superior to, and preferably at least about 10 relative percent, and even more preferably at least about 15 relative percent greater than a foam produced under substantially identical conditions by utilizing a blowing agent consisting of cyclopentane.

Furthermore, it is preferred in certain embodiments that the foams produced in accordance with the present invention have compressive strengths that are on a commercial basis comparable to the compressive strength produced by making a foam under substantially the same conditions except wherein the blowing agent consists of HFC-245fa. In certain preferred embodiments, the foams of the present invention exhibit a compressive strength of at least about 12.5% yield (in the parallel and perpendicular directions), and even more preferably at least about 13% yield in each of said directions.

Methods and Systems

Table 1 describes compositions of this invention which comprise, or consist essentially of E-HFO-1336mzz. These compositions are useful in connection with numerous methods and systems, including as heat transfer fluids in methods and systems for transferring heat, such as refrigerants used in refrigeration, air conditioning, including vehicle air conditioning systems, and heat pump systems. The compositions of this invention are also advantageous for in use in systems and methods of generating aerosols, preferably comprising or consisting of the aerosol propellant in such systems and methods. Methods of forming foams and methods of extinguishing and suppressing fire are also included as embodiments of this invention. The present invention also provides in certain aspects methods of removing residue from articles in which the present compositions are used as solvent compositions in such methods and systems.

Heat Transfer Methods

The preferred heat transfer methods generally comprise providing a composition comprising, or consisting essentially of E-HFO-1336mzz, particularly blends as described in Table 6, and causing heat to be transferred to or from the composition changing the phase of the composition. For example, the present methods provide cooling by absorbing heat from a fluid or article, preferably by evaporating the present refrigerant composition in the vicinity of the body or fluid to be cooled to produce vapor comprising, or consisting essentially of, E-HFO-1336mzz.

In particular, Table 6 shows specific compositions and ranges that are useful in heat transfer methods.

TABLE 6

| Blend Composition | | | |
|---|---|---|---|
| Compound Mixed with E-HFO-1336mzz | Preferred Ranges wt % | More Preferred Ranges wt % | Most Preferred Ranges wt % |
| HFOs | | | |
| HFO-1234ze (E&Z) | 10 to 90 | 25 to 75 | 40-60, 45-55, or 50/50 |
| HFO-1234yf | 10 to 90 | 25 to 75 | 40-60, 45-55, or 50/50 |
| HFO-1225ye (E&Z) | 10 to 90 | 25 to 75 | 40-60, 45-55, or 50/50 |
| HFO-1225yc | 10 to 90 | 25 to 75 | 40-60, 45-55, or 50/50 |
| HFO-1216 | 10 to 90 | 25 to 75 | 40-60, 45-55, or 50/50 |
| HFO-1233zd (E&Z) | 10 to 90 | 25 to 75 | 40-60, 45-55, or 50/50 |
| HFO-1233xf | 10 to 90 | 25 to 75 | 40-60, 45-55, or 50/50 |
| HFO-1243zf | 10 to 90 | 25 to 75 | 40-60, 45-55, or 50/50 |
| HFO-1336mzz (Z) | 10 to 90 | 25 to 75 | 40-60, 45-55, or 50/50 |
| (CF3)2CFCH═CHF (E&Z) | 10 to 90 | 25 to 75 | 40-60, 45-55, or 50/50 |
| (C2F5)(CF3)C═CH2 | 10 to 90 | 25 to 75 | 40-60, 45-55, or 50/50 |
| (CF3)2CFCH═CF2 | 10 to 90 | 25 to 75 | 40-60, 45-55, or 50/50 |
| (CF3)2CFCF═CHF (E&Z) | 10 to 90 | 25 to 75 | 40-60, 45-55, or 50/50 |
| HFCs | | | |
| HFC-245fa | 10 to 90 | 25 to 75 | 40-60, 45-55, or 50/50 |
| HFC-245cb | 10 to 90 | 25 to 75 | 40-60, 45-55, or 50/50 |
| HFC-245ca | 10 to 90 | 25 to 75 | 40-60, 45-55, or 50/50 |
| HFC-245eb | 10 to 90 | 25 to 75 | 40-60, 45-55, or 50/50 |
| HFC-227ea | 10 to 90 | 25 to 75 | 40-60, 45-55, or 50/50 |
| HFC-254eb | 10 to 90 | 25 to 75 | 40-60, 45-55, or 50/50 |

TABLE 6-continued

| Blend Composition | | | |
|---|---|---|---|
| Compound Mixed with E-HFO-1336mzz | Preferred Ranges wt % | More Preferred Ranges wt % | Most Preferred Ranges wt % |
| HFC-236ea | 10 to 90 | 25 to 75 | 40-60, 45-55, or 50/50 |
| HFC-236fa | 10 to 90 | 25 to 75 | 40-60, 45-55, or 50/50 |
| HFC-134 | 10 to 90 | 25 to 75 | 40-60, 45-55, or 50/50 |
| HFC-134a | 10 to 90 | 25 to 75 | 40-60, 45-55, or 50/50 |
| HFC-152 | 10 to 90 | 25 to 75 | 40-60, 45-55, or 50/50 |
| HFC-152a | 10 to 90 | 25 to 75 | 40-60, 45-55, or 50/50 |
| HFC-32 | 10 to 90 | 25 to 75 | 40-60, 45-55, or 50/50 |
| HFC-125 | 10 to 90 | 25 to 75 | 40-60, 45-55, or 50/50 |
| HFC-143a | 10 to 90 | 25 to 75 | 40-60, 45-55, or 50/50 |
| HFC-365mfc | 10 to 90 | 25 to 75 | 40-60, 45-55, or 50/50 |
| HFC-161 | 10 to 90 | 25 to 75 | 40-60, 45-55, or 50/50 |
| HFC-43-10mee | 10 to 90 | 25 to 75 | 40-60, 45-55, or 50/50 |
| HFC-23 | 10 to 90 | 25 to 75 | 40-60, 45-55, or 50/50 |
| HFEs | | | |
| CHF2—O—CHF2 | 10 to 90 | 25 to 75 | 40-60, 45-55, or 50/50 |
| CHF2—O—CH2F | 10 to 90 | 25 to 75 | 40-60, 45-55, or 50/50 |
| CH2F—O—CH2F | 10 to 90 | 25 to 75 | 40-60, 45-55, or 50/50 |
| CH2F—O—CH3 | 10 to 90 | 25 to 75 | 40-60, 45-55, or 50/50 |
| cyclo-CF2—CH2—CF2—O | 10 to 90 | 25 to 75 | 40-60, 45-55, or 50/50 |
| cyclo-CF2—CF2—CH2—O | 10 to 90 | 25 to 75 | 40-60, 45-55, or 50/50 |
| CHF2—O—CF2—CHF2 | 10 to 90 | 25 to 75 | 40-60, 45-55, or 50/50 |
| CF3—CF2—O—CH2F | 10 to 90 | 25 to 75 | 40-60, 45-55, or 50/50 |
| CHF2—O—CHF—CF3 | 10 to 90 | 25 to 75 | 40-60, 45-55, or 50/50 |
| CHF2—O—CF2—CHF2 | 10 to 90 | 25 to 75 | 40-60, 45-55, or 50/50 |
| CH2F—O—CF2—CHF2 | 10 to 90 | 25 to 75 | 40-60, 45-55, or 50/50 |
| CF3—O—CF2—CH3 | 10 to 90 | 25 to 75 | 40-60, 45-55, or 50/50 |
| CHF2—CHF—O—CHF2 | 10 to 90 | 25 to 75 | 40-60, 45-55, or 50/50 |
| CF3—O—CHF—CH2F | 10 to 90 | 25 to 75 | 40-60, 45-55, or 50/50 |
| CF3—CHF—O—CH2F | 10 to 90 | 25 to 75 | 40-60, 45-55, or 50/50 |
| CF3—O—CH2—CHF2 | 10 to 90 | 25 to 75 | 40-60, 45-55, or 50/50 |
| CHF2—O—CH2—CF3 | 10 to 90 | 25 to 75 | 40-60, 45-55, or 50/50 |
| CH2F—CF2—O—CH2F | 10 to 90 | 25 to 75 | 40-60, 45-55, or 50/50 |
| CHF2—O—CF2—CH3 | 10 to 90 | 25 to 75 | 40-60, 45-55, or 50/50 |
| CHF2—CF2—O—CH3 | 10 to 90 | 25 to 75 | 40-60, 45-55, or 50/50 |
| CH2F—O—CHF—CH2F | 10 to 90 | 25 to 75 | 40-60, 45-55, or 50/50 |

TABLE 6-continued

| Blend Composition | | | |
|---|---|---|---|
| Compound Mixed with E-HFO-1336mzz | Preferred Ranges wt % | More Preferred Ranges wt % | Most Preferred Ranges wt % |
| CHF2—CHF—O—CH2F | 10 to 90 | 25 to 75 | 40-60, 45-55, or 50/50 |
| CF3—O—CHF—CH3 | 10 to 90 | 25 to 75 | 40-60, 45-55, or 50/50 |
| CF3—CHF—O—CH3 | 10 to 90 | 25 to 75 | 40-60, 45-55, or 50/50 |
| CHF2—O—CH2—CHF2 | 10 to 90 | 25 to 75 | 40-60, 45-55, or 50/50 |
| CF3—O—CH2—CH2F | 10 to 90 | 25 to 75 | 40-60, 45-55, or 50/50 |
| CF3—CH2—O—CH2F | 10 to 90 | 25 to 75 | 40-60, 45-55, or 50/50 |
| CF2H—CF2—CF2—O—CH3 | 10 to 90 | 25 to 75 | 40-60, 45-55, or 50/50 |
| Hydrocarbons | | | |
| propane | 10 to 90 | 25 to 75 | 40-60, 45-55, or 50/50 |
| butane | 10 to 90 | 25 to 75 | 40-60, 45-55, or 50/50 |
| isobutane | 10 to 90 | 25 to 75 | 40-60, 45-55, or 50/50 |
| n-pentane (high HFO) | 10 to 90 | 25 to 75 | 40-60, 45-55, or 50/50 |
| n-pentane (high n-pentane) | 10 to 90 | 25 to 75 | 40-60, 45-55, or 50/50 |
| isopentane (high HFO) | 10 to 90 | 25 to 75 | 40-60, 45-55, or 50/50 |
| isopentane (high isopentane) | 10 to 90 | 25 to 75 | 40-60, 45-55, or 50/50 |
| neopentane (high HFO) | 10 to 90 | 25 to 75 | 40-60, 45-55, or 50/50 |
| neopentane (high neopentane) | 10 to 90 | 25 to 75 | 40-60, 45-55, or 50/50 |
| cyclopentane (high HFO) | 10 to 90 | 25 to 75 | 40-60, 45-55, or 50/50 |
| cyclopentane (high cyclopentane) | 10 to 90 | 25 to 75 | 40-60, 45-55, or 50/50 |
| n-hexane | 10 to 90 | 25 to 75 | 40-60, 45-55, or 50/50 |
| isohexane | 10 to 90 | 25 to 75 | 40-60, 45-55, or 50/50 |
| heptane | 10 to 90 | 25 to 75 | 40-60, 45-55, or 50/50 |
| Ethers | | | |
| dimethyl ether | 10 to 90 | 25 to 75 | 40-60, 45-55, or 50/50 |
| methylethyl ether | 10 to 90 | 25 to 75 | 40-60, 45-55, or 50/50 |
| diethyl ether | 10 to 90 | 25 to 75 | 40-60, 45-55, or 50/50 |
| methylpropyl ether | 10 to 90 | 25 to 75 | 40-60, 45-55, or 50/50 |
| methylisopropyl ether | 10 to 90 | 25 to 75 | 40-60, 45-55, or 50/50 |
| ethylpropyl ether | 10 to 90 | 25 to 75 | 40-60, 45-55, or 50/50 |
| ethylisopropyl ether | 10 to 90 | 25 to 75 | 40-60, 45-55, or 50/50 |
| dipropyl ether | 10 to 90 | 25 to 75 | 40-60, 45-55, or 50/50 |
| diisopropyl ether | 10 to 90 | 25 to 75 | 40-60, 45-55, or 50/50 |
| dimethoxymethane | 10 to 90 | 25 to 75 | 40-60, 45-55, or 50/50 |
| diethoxymethane | 10 to 90 | 25 to 75 | 40-60, 45-55, or 50/50 |

TABLE 6-continued

| Blend Composition | | | |
|---|---|---|---|
| Compound Mixed with E-HFO-1336mzz | Preferred Ranges wt % | More Preferred Ranges wt % | Most Preferred Ranges wt % |
| dipropoxymethane | 10 to 90 | 25 to 75 | 40-60, 45-55, or 50/50 |
| dibutoxymethane | 10 to 90 | 25 to 75 | 40-60, 45-55, or 50/50 |
| Aldehydes | | | |
| formaldehyde | 10 to 90 | 25 to 75 | 40-60, 45-55, or 50/50 |
| acetaldehyde | 10 to 90 | 25 to 75 | 40-60, 45-55, or 50/50 |
| propanal | 10 to 90 | 25 to 75 | 40-60, 45-55, or 50/50 |
| butanal | 10 to 90 | 25 to 75 | 40-60, 45-55, or 50/50 |
| isobutanal | 10 to 90 | 25 to 75 | 40-60, 45-55, or 50/50 |
| Ketones | | | |
| Acetone | 10 to 90 | 25 to 75 | 40-60, 45-55, or 50/50 |
| Methylethylketone | 10 to 90 | 25 to 75 | 40-60, 45-55, or 50/50 |
| methylisobutylketone | 10 to 90 | 25 to 75 | 40-60, 45-55, or 50/50 |
| perfluoroethylisopropylketone (C2F5C(O)CF(CF3)2 | 10 to 90 | 25 to 75 | 40-60, 45-55, or 50/50 |
| Others | | | |
| water | 10 to 90 | 25 to 75 | 40-60, 45-55, or 50/50 |
| methyl formate | 10 to 90 | 25 to 75 | 40-60, 45-55, or 50/50 |
| ethyl formate | 10 to 90 | 25 to 75 | 40-60, 45-55, or 50/50 |
| formic acid | 10 to 90 | 25 to 75 | 40-60, 45-55, or 50/50 |
| trans-1,2-dichloroethylene (t-DCE) | 10 to 90 | 25 to 75 | 40-60, 45-55, or 50/50 |
| $CO_2$ | 10 to 90 | 25 to 75 | 40-60, 45-55, or 50/50 |
| HCFO-1232xf | 10 to 90 | 25 to 75 | 40-60, 45-55, or 50/50 |
| HCFO-1223xd | 10 to 90 | 25 to 75 | 40-60, 45-55, or 50/50 |
| HCFO-1233xf | 10 to 90 | 25 to 75 | 40-60, 45-55, or 50/50 |
| HCFO-1233zd (E&Z) | 10 to 90 | 25 to 75 | 40-60, 45-55, or 50/50 |
| HCFO-1224yd (E&Z) | 10 to 90 | 25 to 75 | 40-60, 45-55, or 50/50 |
| CFC-13 (CF3Cl) | 10 to 90 | 25 to 75 | 40-60, 45-55, or 50/50 |
| HCFO-1121a (CHF═CCl2) | 10 to 90 | 25 to 75 | 40-60, 45-55, or 50/50 |
| HCFO-1121 (CFCl═CHCl) | 10 to 90 | 25 to 75 | 40-60, 45-55, or 50/50 |
| HCFO-1131a (CH2═CFCl) | 10 to 90 | 25 to 75 | 40-60, 45-55, or 50/50 |
| HCFO-1131 (CHF═CHCl) | 10 to 90 | 25 to 75 | 40-60, 45-55, or 50/50 |
| HCFO-1122 (CF2═CHCl) | 10 to 90 | 25 to 75 | 40-60, 45-55, or 50/50 |
| HCFO-1113 (CF2═CFCl) | 10 to 90 | 25 to 75 | 40-60, 45-55, or 50/50 |
| CH2═CHCl | 10 to 90 | 25 to 75 | 40-60, 45-55, or 50/50 |
| CH3Cl | 10 to 90 | 25 to 75 | 40-60, 45-55, or 50/50 |
| HCFC-133a (CF3CH2Cl) | 10 to 90 | 25 to 75 | 40-60, 45-55, or 50/50 |

TABLE 6-continued

| Blend Composition | | | |
|---|---|---|---|
| Compound Mixed with E-HFO-1336mzz | Preferred Ranges wt % | More Preferred Ranges wt % | Most Preferred Ranges wt % |
| CFC-115 (CF3CF2Cl) | 10 to 90 | 25 to 75 | 40-60, 45-55, or 50/50 |
| 3,3,3-Trifluoropropyne | 10 to 90 | 25 to 75 | 40-60, 45-55, or 50/50 |
| HCFC-124 (CF3CHFCl) | 10 to 90 | 25 to 75 | 40-60, 45-55, or 50/50 |
| HCC-40 (CH3Cl) | 10 to 90 | 25 to 75 | 40-60, 45-55, or 50/50 |
| HCFC-22 (CF2HCl) | 10 to 90 | 25 to 75 | 40-60, 45-55, or 50/50 |
| cis-HFO-1234ze + HFO-1225yeZ | 10 to 90 | 25 to 75 | 40-60, 45-55, or 50/50 |
| Mixtures of any of the above plus water | 1 to 99% H2O | 5 to 95% H2O | 10 to 90% H2O |
| Mixtures of any of the above plus CO2 | 1 to 99% CO2 | 5 to 95% CO2 | 10 to 90% CO2 |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO2 | 10 to 90 | 5 to 95 | 10 to 90 |
| Mixtures with cis-HFO-1234ze + CO2 + 1225yeZ | 10 to 90 | 5 to 95 | 10 to 90 |
| Mixtures with cis-HFO-1234ze + HFC-245fa | 10 to 90 | 5 to 95 | 10 to 90 |

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1A.

Preferably the methods include the further step of compressing the refrigerant vapor, usually with a compressor or similar equipment to produce vapor of the present composition at a relatively elevated pressure. Generally, the step of compressing the vapor results in the addition of heat to the vapor, thus causing an increase in the temperature of the relatively high-pressure vapor. Preferably, the present methods include removing from this relatively high temperature, high pressure vapor at least a portion of the heat added by the evaporation and compression steps. The heat removal step preferably includes condensing the high temperature, high-pressure vapor while the vapor is in a relatively high-pressure condition to produce a relatively high-pressure liquid comprising, or consisting essentially of, E-HFO-1336mzz. This relatively high-pressure liquid preferably then undergoes a nominally isoenthalpic reduction in pressure to produce a relatively low temperature, low-pressure liquid. In such embodiments, it is this reduced temperature refrigerant liquid which is then vaporized by heat transferred from the body or fluid to be cooled.

In one embodiment of the invention, the compositions of the invention may be used in a method for producing cooling which comprises evaporating a refrigerant comprising, or consisting essentially of, E-HFO-1336mzz, particularly blends as described in Table 1A, in the vicinity of a liquid or body to be cooled.

In another embodiment of the invention, the compositions of the invention may be used in a method for producing heating which comprises condensing a refrigerant comprising, or consisting essentially of, E-HFO-1336mzz, particularly blends as described in Table 1, in the vicinity of a liquid or body to be heated. Such methods, as mentioned herein before, frequently are reverse cycles to the refrigeration cycle described above.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1A, and those amounts are likewise applicable for this use of the composition of the invention.

Refrigerant Compositions

The present methods, systems and compositions comprising, or consisting essentially of E-HFO-1336mzz, and in particular, blends as described in Table 1, are thus adaptable for use in connection with air conditioning systems and devices, including automotive air conditioning systems, commercial refrigeration systems and devices (including medium and low temperature systems and transport refrigeration), chillers, residential refrigerator and freezers, general air conditioning systems, including residential and window air conditioners, chillers, heat pumps, including high temperature heat pumps (with condenser temperatures greater than 55° C., 70° C., or 100° C.) and the like.

Many existing refrigeration systems are currently adapted for use in connection with existing refrigerants, and the compositions of the present invention are believed to be adaptable for use in many of such systems, either with or without system modification. In many applications the compositions of the present invention may provide an advantage as a replacement in systems, which are currently based on refrigerants having a relatively high capacity. Furthermore, in embodiments where it is desired to use a lower capacity refrigerant composition of the present invention, for reasons of efficiency for example, to replace a refrigerant of higher capacity, such embodiments of the present compositions provide a potential advantage. Thus, it is preferred in certain embodiments to use compositions comprising, or consisting essentially of, E-HFO-1336mzz, either alone or in combination with one or more other compounds, particularly blends as described in Table 1A, as a replacement for existing refrigerants, such as CFC-11, CFC-12, CFC-113, CFC-114 or CFC-114a, HCFC-123, HCFC-124, HCFC-22, HFC-134a, HFC-236fa, HFC-245fa, R-404A, R-407C, R-407A, R-407F, R-407H, R410A and R507 among others. In certain applications, the refrigerants of the present invention potentially permit the beneficial use of larger displacement compressors, thereby resulting in better energy efficiency than other refrigerants, such as HCFC-123 or HFC-134a. Therefore, the refrigerant compositions of the present invention, particularly compositions comprising, or consisting essentially of, E-HFO-1336mzz, provide the possibility of achieving a competitive advantage on an energy basis for refrigerant replacement applications.

Although, as described above, it is contemplated that the compositions of the present invention may include the compounds of the present invention in widely ranging amounts, it is generally preferred that refrigerant compositions of the present invention comprise E-HFO-1336mzz, in an amount that is at least about 50% by weight, and even more preferably at least about 70% by weight, of the composition.

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 5 to about 50 percent by weight of the composition. Or in another embodiment, the compositions useful as a refrigerant may, in use, include a lubricant, from about 30 to about 50 percent by weight of the composition Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition.

Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), polyvinyl ethers (PVEs), fluorinated and perfluorinated oils (e.g., perfluoropolyethers, PFPEs), polycarbonates, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention.

It is contemplated that the compositions of the present, including particularly those comprising, or consisting essentially of, E-HFO-1336mzz, and particularly blends as set forth in Table 1A, also have advantage (either in original systems or when used as a replacement for refrigerants such as R-12 and R-500), in chillers typically used in connection with commercial air conditioning systems. In certain of such embodiments it is preferred to including in the present E-HFO-1336mzz compositions from about 0.5 to about 5% of a flammability suppressant, such as CF3I.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250™ from Witco, Zerol 300™ from Shrieve Chemical, Sunisco 3GS from Witco, and Calumet R015 from Calumet. Commercially available alkyl benzene lubricants include Zerol 150™ Commercially available esters include neopentyl glycol dipelargonate which is available as Emery 2917™ and Hatcol 2370™. Other useful esters include phosphate esters, dibasic acid esters, and fluoroesters.

Additionally, perfluoropolyethers (PFPEs), such as Krytox® Galden®, Fomblin® and the like may serve as refrigerant lubricants or performance enhancing additives.

Preferred lubricants include polyalkylene glycols and polyol esters. Certain more preferred lubricants include polyalkylene glycols. Certain more preferred lubricants include polyol ethers.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

Power Cycle Use

Rankine cycle systems are known to be a simple and reliable means to convert heat energy into mechanical shaft power. Organic working fluids are useful in place of water/steam when low-grade thermal energy is encountered. Water/steam systems operating with low-grade thermal energy (typically 400° F. and lower) will have associated high volumes and low pressures. To keep system size small and efficiency high, organic working fluids with boiling points near room temperature are employed. Such fluids would have higher gas densities lending to higher capacity and favorable transport and heat transfer properties lending to higher efficiency as compared to water at low operating temperatures. In industrial settings there are more opportunities to use flammable working fluids such as toluene and pentane, particularly when the industrial setting has large quantities of flammables already on site in processes or storage. For instances where the risk associated with use of a flammable working fluid is not acceptable, such as power generation in populous areas or near buildings, other fluids such as CFC-113 and CFC-11 were used. Although these materials were non-flammable, they were a risk to the environment because of their ozone-depletion potential. Ideally, the organic working fluid should be environmentally acceptable, non-flammable, of a low order of toxicity, and operate at positive pressures.

Organic Rankine Cycle (ORC) systems are often used to recover waste heat from industrial processes. In combined heat and power (cogeneration) applications, waste heat from combustion of fuel used to drive the prime mover of a generator set is recovered and used to make hot water for building heat, for example, or for supplying heat to operate an absorption chiller to provide cooling. In some cases, the demand for hot water is small or does not exist. The most difficult case is when the thermal requirement is variable and load matching becomes difficult, confounding efficient operation of the combined heat and power system. In such an instance, it is more useful to convert the waste heat to shaft power by using an organic Rankine cycle system. The shaft power can be used to operate pumps, for example, or it may be used to generate electricity. By using this approach, the overall system efficiency is higher and fuel utilization is greater. Air emissions from fuel combustion can be decreased since more electric power can be generated for the same amount of fuel input.

The process that produces waste heat is at least one selected from the group consisting of fuel cells, internal combustion engines, internal compression engines, external combustion engines, and turbines. Other sources of waste heat can be found in association with operations at oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns (drying), calcining operations, steel industry, glass industry, foundries, smelting, air-conditioning, refrigeration, and central heating. See U.S. Pat. No. 7,428,816, the disclosure of which is hereby incorporated herein by reference.

Preferred compositions for ORC power cycle use are described below in Table 7 (with all percentages being in percent by weight and being understood to be proceeded by the word "about").

TABLE 7

| ORC Blends | | | |
|---|---|---|---|
| Compound Mixed with E-HFO-1336mzz | Preferred Ranges wt % | More Preferred Ranges wt % | Most Preferred Ranges wt % |
| HFOs | | | |
| HFO-1234ze (E&Z) | 1 to 99 | 5 to 95 | 10 to 90 |
| HFO-1234yf | 1 to 99 | 5 to 95 | 10 to 90 |
| HFO-1225ye (E&Z) | 1 to 99 | 5 to 95 | 10 to 90 |
| HFO-1225yc | 1 to 99 | 5 to 95 | 10 to 90 |
| HFO-1233zd (E&Z) | 1 to 99 | 5 to 95 | 10 to 90 |
| HFO-1233xf | 1 to 99 | 5 to 95 | 10 to 90 |
| HFO-1336mzz (Z) | 1 to 99 | 64-94 | 6-36 |
| (CF3)2CFCH═CHF (E&Z) | 1 to 99 | 5 to 95 | 10 to 90 |
| (C2F5)(CF3)C═CH2 | 1 to 99 | 5 to 95 | 10 to 90 |
| (CF3)2CFCH═CF2 | 1 to 99 | 5 to 95 | 10 to 90 |
| (CF3)2CFCF═CHF (E&Z) | 1 to 99 | 5 to 95 | 10 to 90 |
| HFCs | | | |
| HFC-245fa | 1 to 99 | 5 to 95 | 10 to 90 |
| HFC-245cb | 1 to 99 | 5 to 95 | 10 to 90 |
| HFC-245ca | 1 to 99 | 5 to 95 | 10 to 90 |
| HFC-227ea | 1 to 99 | 5 to 95 | 10 to 90 |
| HFC-236ea | 1 to 99 | 5 to 95 | 10 to 90 |
| HFC-236fa | 1 to 99 | 5 to 95 | 10 to 90 |
| HFC-134 | 1 to 99 | 5 to 95 | 10 to 90 |
| HFC-134a | 1 to 99 | 5 to 95 | 10 to 90 |
| HFC-152 | 1 to 99 | 5 to 95 | 10 to 90 |
| HFC-152a | 1 to 99 | 5 to 95 | 10 to 90 |
| HFC-32 | 1 to 99 | 5 to 95 | 10 to 90 |
| HFC-125 | 1 to 99 | 5 to 95 | 10 to 90 |
| HFC-143a | 1 to 99 | 5 to 95 | 10 to 90 |

TABLE 7-continued

| ORC Blends | | | |
|---|---|---|---|
| Compound Mixed with E-HFO-1336mzz | Preferred Ranges wt % | More Preferred Ranges wt % | Most Preferred Ranges wt % |
| HFC-365mfc | 1 to 99 | 5 to 95 | 10 to 90 |
| HFC-161 | 1 to 99 | 5 to 95 | 10 to 90 |
| HFC-43-10mee | 1 to 99 | 5 to 95 | 10 to 90 |
| HFEs | | | |
| CHF2—O—CHF2 | 1 to 99 | 5 to 95 | 10 to 90 |
| CHF2—O—CH2F | 1 to 99 | 5 to 95 | 10 to 90 |
| CH2F—O—CH2F | 1 to 99 | 5 to 95 | 10 to 90 |
| CH2F—O—CH3 | 1 to 99 | 5 to 95 | 10 to 90 |
| cyclo-CF2—CH2—CF2—O | 1 to 99 | 5 to 95 | 10 to 90 |
| cyclo-CF2—CF2—CH2—O | 1 to 99 | 5 to 95 | 10 to 90 |
| CHF2—O—CF2—CHF2 | 1 to 99 | 5 to 95 | 10 to 90 |
| CF3—CF2—O—CH2F | 1 to 99 | 5 to 95 | 10 to 90 |
| CHF2—O—CHF—CF3 | 1 to 99 | 5 to 95 | 10 to 90 |
| CHF2—O—CF2—CHF2 | 1 to 99 | 5 to 95 | 10 to 90 |
| CH2F—O—CF2—CHF2 | 1 to 99 | 5 to 95 | 10 to 90 |
| CF3—O—CF2—CH3 | 1 to 99 | 5 to 95 | 10 to 90 |
| CHF2—CHF—O—CHF2 | 1 to 99 | 5 to 95 | 10 to 90 |
| CF3—O—CHF—CH2F | 1 to 99 | 5 to 95 | 10 to 90 |
| CF3—CHF—O—CH2F | 1 to 99 | 5 to 95 | 10 to 90 |
| CF3—O—CH2—CHF2 | 1 to 99 | 5 to 95 | 10 to 90 |
| CHF2—O—CH2—CF3 | 1 to 99 | 5 to 95 | 10 to 90 |
| CH2F—CF2—O—CH2F | 1 to 99 | 5 to 95 | 10 to 90 |
| CHF2—O—CF2—CH3 | 1 to 99 | 5 to 95 | 10 to 90 |
| CHF2—CF2—O—CH3 | 1 to 99 | 5 to 95 | 10 to 90 |
| CH2F—O—CHF—CH2F | 1 to 99 | 5 to 95 | 10 to 90 |
| CHF2—CHF—O—CH2F | 1 to 99 | 5 to 95 | 10 to 90 |
| CF3—O—CHF—CH3 | 1 to 99 | 5 to 95 | 10 to 90 |
| CF3—CHF—O—CH3 | 1 to 99 | 5 to 95 | 10 to 90 |
| CHF2—O—CH2—CHF2 | 1 to 99 | 5 to 95 | 10 to 90 |
| CF3—O—CH2—CH2F | 1 to 99 | 5 to 95 | 10 to 90 |
| CF3—CH2—O—CH2F | 1 to 99 | 5 to 95 | 10 to 90 |
| CF2H—CF2—CF2—O—CH3 | 1 to 99 | 5 to 95 | 10 to 90 |
| Hydrocarbons | | | |
| propane | 1 to 99 | 5 to 95 | 10 to 90 |
| butane | 1 to 99 | 5 to 95 | 10 to 90 |
| isobutane | 1 to 99 | 5 to 95 | 10 to 90 |
| n-pentane (high HFO) | 1 to 99 | 50 to 99 | 60 to 99 |
| n-pentane (high n-pentane) | 1 to 99 | 1 to 30 | 1 to 20 |
| isopentane (high HFO) | 1 to 99 | 50 to 99 | 60 to 90 |
| isopentane (high isopentane) | 1 to 99 | 1 to 30 | 1 to 20 |
| neopentane (high HFO) | 1 to 99 | 50 to 99 | 60 to 99 |
| neopentane (high neopentane) | 1 to 99 | 1 to 30 | 1 to 20 |
| cyclopentane (high HFO) | 1 to 99 | 50 to 99 | 60 to 99 |
| cyclopentane (high cyclopentane) | 1 to 99 | 1 to 30 | 1 to 20 |
| n-hexane | 1 to 99 | 5 to 95 | 10 to 90 |
| isohexane | 1 to 99 | 5 to 95 | 10 to 90 |
| heptane | 1 to 99 | 5 to 95 | 10 to 90 |
| Ethers | | | |
| dimethyl ether | 1 to 99 | 5 to 95 | 10 to 90 |
| methylethyl ether | 1 to 99 | 5 to 95 | 10 to 90 |
| diethyl ether | 1 to 99 | 5 to 95 | 10 to 90 |
| methylpropyl ether | 1 to 99 | 5 to 95 | 10 to 90 |
| methylisopropyl ether | 1 to 99 | 5 to 95 | 10 to 90 |
| ethylpropyl ether | 1 to 99 | 5 to 95 | 10 to 90 |
| ethylisopropyl ether | 1 to 99 | 5 to 95 | 10 to 90 |
| dipropyl ether | 1 to 99 | 5 to 95 | 10 to 90 |
| diisopropyl ether | 1 to 99 | 5 to 95 | 10 to 90 |
| dimethoxymethane | 1 to 99 | 5 to 95 | 10 to 90 |
| diethoxymethane | 1 to 99 | 5 to 95 | 10 to 90 |
| dipropoxymethane | 1 to 99 | 5 to 95 | 10 to 90 |
| dibutoxymethane | 1 to 99 | 5 to 95 | 10 to 90 |
| Aldehydes | | | |
| formaldehyde | 1 to 99 | 5 to 95 | 10 to 90 |
| acetaldehyde | 1 to 99 | 5 to 95 | 10 to 90 |
| propanal | 1 to 99 | 5 to 95 | 10 to 90 |

TABLE 7-continued

| ORC Blends | | | |
|---|---|---|---|
| Compound Mixed with E-HFO-1336mzz | Preferred Ranges wt % | More Preferred Ranges wt % | Most Preferred Ranges wt % |
| butanal | 1 to 99 | 5 to 95 | 10 to 90 |
| isobutanal | 1 to 99 | 5 to 95 | 10 to 90 |
| Ketones | | | |
| Acetone | 1 to 99 | 5 to 95 | 10 to 90 |
| Methylethylketone | 1 to 99 | 5 to 95 | 10 to 90 |
| methylisobutylketone | 1 to 99 | 5 to 95 | 10 to 90 |
| perfluoroethylisopropylketone (C2F5C(O)CF(CF3)2 | 1 to 99 | 5 to 95 | 10 to 90 |
| Others | | | |
| water | 1 to 99 | 5 to 95 | 10 to 90 |
| methyl formate | 1 to 99 | 5 to 95 | 10 to 90 |
| ethyl formate | 1 to 99 | 5 to 95 | 10 to 90 |
| formic acid | 1 to 99 | 5 to 95 | 10 to 90 |
| trans-1,2-dichloroethylene (t-DCE) | 1 to 99 | 5 to 95 | 10 to 90 |
| CO2 | 1 to 99 | 5 to 95 | 10 to 90 |
| cis-HFO-1234ze + HFO-1225yeZ | | | |
| Mixtures of any of the above plus water | 1 to 99% H2O | 5 to 95% H2O | 10 to 90% H2O |
| Mixtures of any of the above plus CO2 | 1 to 99% CO2 | 5 to 95% CO2 | 10 to 90% CO2 |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO2 | 1 to 99 | 5 to 95 | 10 to 90 |
| Mixtures with cis-HFO-1234ze + CO2 + 1225yeZ | 1 to 99 | 5 to 95 | 10 to 90 |
| Mixtures with cis-HFO-1234ze + HFC-245fa | 1 to 99 | 5 to 95 | 10 to 90 |

One specific embodiment of a power cycle use of this compound is a process for recovering waste heat in an Organic Rankine Cycle system in which the working fluid is a composition comprising, or consisting essentially of, E-HFO-1336mzz and optionally, one or more additional compounds, as set forth above in Table 6.

Power Cycle Example

Example 3

HFO-1336mzz(E)/HFO-1336mzz(Z) Blends Approximating the Volumetric Capacity for Power Generation of HFC-245fa without Exceeding the Equipment Maximum Permissible Working Pressure Table 8 compares the performance of Rankine cycles operated at an evaporating temperature of 120° C. with HFO-1336mzz-E/HFO-1336mzz-Z blends of various compositions to performance of a Rankine cycle operated at the same evaporating temperature with HFC-245fa. The volumetric capacity for power generation with blend A.1 is within 5% of that with HFC-245fa. The volumetric capacity for power generation with blend A.2 matches that with HFC-245fa with an evaporating pressure not exceeding that of HFC-245fa. The volumetric capacity for power generation with blend A.3 exceeds that with HFC-245fa by about 5% with an evaporating pressure not exceeding 2.18 MPa. Finally, the volumetric capacity for power generation with blend A.4 is the maximum possible (higher than that with HFC-245fa by about 12.5%) with an evaporating pressure not exceeding 2.18 MPa. HFO-1336mzz(E)/HFO-1336mzz (Z) blends containing 66.50 to 94 wt % HFO-1336mzz(E) would be advantageous as replacements for HFC-245fa in ORCs.

TABLE 8

Subcritical ORC performance with HFO-1336mzz-E/HFO-1336mzz-Z Blends at an evaporating temperature of 120° C.

| | BLEND A.1 HFO-1336mzz-E/HFO-1336mzz-Z Blend 66.50/33.50 wt % | BLEND A.2 HFO-1336mzz-E/HFO-1336mzz-Z Blend 74.50/25.50 wt % | HFC-245fa | BLEND A.3 HFO-1336mzz-E/HFO-1336mzz-Z Blend 82.30/17.70 wt % | BLEND A.4 HFO-1336mzz-E/HFO-1336mzz-Z Blend 94.00/06.00 wt % |
|---|---|---|---|---|---|
| Tevap, ° C. | 120 | 120 | 120 | 120 | 120 |
| Tcond, ° C. | 35 | 35 | 35 | 35 | 35 |
| ΔTsuph, ° C. | 0 | 0 | 0 | 0 | 0 |
| ΔTsubc, ° C. | 0 | 0 | 0 | 0 | 0 |
| EFF_expn | 0.85 | 0.85 | 0.85 | 0.85 | 0.85 |
| EFF_comp | 0.85 | 0.85 | 0.85 | 0.85 | 0.85 |
| Pevap, MPa | 1.83 | 1.93 | 1.93 | 2.03 | 2.18 |
| Pcond, MPa | 0.21 | 0.22 | 0.21 | 0.24 | 0.26 |
| Texpn_out, ° C. | 65.12 | 63.47 | 61.28 | 61.76 | 59.02 |
| CAP_e, kJ/$m^3$ (Volumetric Capacity for power generation) | 343.02 | 361.39 | 361.47 | 379.51 | 406.57 |

Cleaning and Contaminant Removal

The present invention also provides methods of removing containments from a product, part, component, substrate, or any other article or portion thereof by applying to the article a composition of the present invention comprising, or consisting essentially of, E-HFO-1336mzz, and in particular, the blends set forth in Table 1. For the purposes of convenience, the term "article" is used herein to refer to all such products, parts, components, substrates, and the like and is further intended to refer to any surface or portion thereof. Furthermore, the term "contaminant" is intended to refer to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant" as used herein is intended to cover and encompass such a photo resist material.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

Preferred methods of the present invention comprise applying the present composition to the article. Although it is contemplated that numerous and varied cleaning techniques can employ the compositions of the present invention to good advantage, it is considered to be particularly advantageous to use the present compositions in connection with supercritical cleaning techniques. Supercritical cleaning is disclosed in U.S. Pat. No. 6,589,355, which is incorporated herein by reference.

For supercritical cleaning applications, it is preferred in certain embodiments to include in the present cleaning compositions, in addition to the composition of the present invention, another component, such as CO2 and other additional components known for use in connection with supercritical cleaning applications.

It may also be possible and desirable in certain embodiments to use the present cleaning compositions in connection with particular sub-critical vapor degreasing and solvent cleaning methods. For all solvent uses, compositions containing the compound E-HFO-1336mzz may preferably be blended with one or more of the following compounds; cis-1234ze, cis-1233zd, HFC-245fa, Methylal (dimethoxymethane), methylethylketone, methylisobutylketone, and/or HFC-134a. More preferred blends comprise E-HFO-1336mzz blended with one or more of the following compounds; pentanes, hexanes, HFC-365, $C_4F_9OCH_3$, $C_4F_9OC_2H_5$, propane, butane, isobutane, and/or dimethylether. Most preferred blends comprise E-HFO-1336mzz blended with one or more of the following compounds; trans-1,2-dichloroethylene, trans-HFO-1234ze, trans-HCFO-1233zd, trans-1336, HFC-43-10, HFC-152a, methanol, ethanol, isopropanol, and/or acetone.

Another cleaning embodiment of the invention comprises the removal of contaminants from vapor compression systems and their ancillary components when these systems are manufactured and serviced. As used herein, the term "contaminants" refers to processing fluids, lubricants, particulates, sludge, and/or other materials that are used in the manufacture of these systems or generated during their use. In general, these contaminants comprise compounds such as alkylbenzenes, mineral oils, esters, polyalkyleneglycols, polyvinylethers and other compounds that are made primarily of carbon, hydrogen and oxygen. The compositions of the present invention will be useful for this purpose.

Propellants for Sprayable Compositions

In another embodiment, the compositions of this invention comprising, or consisting essentially of, E-HFO-1336mzz, and in particular, blends as described in Table 1, may be used as propellants in sprayable compositions, either alone or in combination with known propellants. For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

The sprayable composition includes a material to be sprayed and a propellant comprising, or consisting essentially of E-HFO-1336mzz, and in particular, blends as described in Table 1. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

For aerosol uses, compositions containing the compound trans-1,1,1,4,4,4-hexafluoro-2-butene (E-HFO-1336mzz) may preferably be blended with one or more of the following compounds; cis-HFO-1234ze, cis-HCFO-1233zd, HFC-245fa, Methylal (dimethoxymethane), methylethylketone, methylisobutylketone, and/or HFC-134a. More preferred blends comprise E-HFO-1336mzz blended with one or more of the following compounds; pentanes, hexanes, HFC-365, $C_4F_9OCH_3$ and/or $C_4F_9OC_2H_5$. Most preferred blends comprise E-HFO-1336mzz blended with one or more of the following compounds; trans-1,2-dichloroethylene, trans-HFO-1234ze, trans-HCFO-1233zd, cis-HFO-1336mzz, HFC-43-10, HFC-152a, methanol, ethanol, isopropanol, propane, butane, isobutane, dimethylether and/or acetone.

In this use, the active ingredient to be sprayed is mixed with inert ingredients, solvents, and other materials may also be present in the sprayable mixture. Preferably, the sprayable composition is an aerosol. Suitable active materials to be sprayed include, without limitation, lubricants, insecticides, cleaners, cosmetic materials such as deodorants, perfumes and hair sprays, polishing agents, as well as medicinal materials such as skin cooling agents (sunburn treatment), topical anesthetics and anti-asthma medications.

In another aspect, the present invention provides propellant comprising, or consisting essentially of, E-HFO-1336mzz, either alone or in combination with one or more other compounds, in particular blends as set forth in Table 1, such propellant composition preferably being a sprayable composition. The propellant compositions of the present invention preferably comprise a material to be sprayed and a propellant comprising, or consisting essentially of, E-HFO-1336mzz. Inert ingredients, solvents, and other materials may also be present in the sprayable mixture. Preferably, the sprayable composition is an aerosol. Suitable materials to be sprayed include, without limitation, lubricants, insecticides, cleaners, cosmetic materials such as deodorants, perfumes and hair sprays, polishing agents as well as medicinal materials such as anti-asthma components, and any other medication or the like, including preferably any other medicament or agent intended to be inhaled. The medicament or other therapeutic agent is preferably present in the composition in a therapeutic amount, with a substantial portion of the balance of the composition comprising, or consisting essentially of, E-HFO-1336mzz.

Aerosol products for industrial, consumer or medical use typically contain one or more propellants along with one or more active ingredients, inert ingredients or solvents. The propellant provides the force that expels the product in aerosolized form. While some aerosol products are propelled with compressed gases like carbon dioxide, nitrogen, nitrous oxide and even air, most commercial aerosols use liquefied gas propellants. The most commonly used liquefied gas propellants are hydrocarbons such as butane, isobutane, and propane. Dimethyl ether and HFC-152a (1,1-difluoroethane) are also used, either alone or in blends with the hydrocarbon propellants. Unfortunately, all of these liquefied gas propellants are highly flammable and their incorporation into aerosol formulations will often result in flammable aerosol products.

Applicants have come to appreciate the continuing need for nonflammable, liquefied gas propellants with which to formulate aerosol products. The present invention provides compositions of the present invention, particularly and preferably compositions comprising, or consisting essentially of, E-HFO-1336mzz, and in particular, those blends set forth in Table 1, for use in certain industrial aerosol products, including for example spray cleaners, lubricants, and the like, and in medicinal aerosols, including for example to deliver medications to the lungs or mucosal membranes. Examples of this includes metered dose inhalers (MDIs) for the treatment of asthma and other chronic obstructive pulmonary diseases and for delivery of medicaments to accessible mucous membranes or intranasally. The present invention thus includes methods for treating ailments, diseases and similar health related problems of an organism (such as a human or animal) comprising applying a composition of the present invention containing a medicament or other therapeutic component to the organism in need of treatment. In certain preferred embodiments, the step of applying the present composition comprises providing a MDI containing the composition of the present invention (for example, introducing the composition into the MDI) and then discharging the present composition from the MDI.

As used herein, the term "nonflammable" refers to compounds and compositions of the present invention which do not exhibit a flashpoint as measured by one of the standard flash point methods, for example ASTM-1310-86 "Flash point of liquids by tag Open-cup apparatus."

The present compositions can be used to formulate a variety of industrial aerosols or other sprayable compositions such as contact cleaners, dusters, lubricant sprays, and the like, and consumer aerosols such as personal care products, household products and automotive products. E-HFO-1336mzz is particularly preferred for use as an important component of propellant compositions for in medicinal aerosols such as metered dose inhalers. The medicinal aerosol and/or propellant and/or sprayable compositions of the present invention in many applications include, in addition to E-HFO-1336mzz, a medicament such as a beta-agonist, a corticosteroid or other medicament, and, optionally, other ingredients, such as surfactants, solvents, other propellants, flavorants and other excipients.

Sterilization

Many articles, devices and materials, particularly for use in the medical field, must be sterilized prior to use for the health and safety reasons, such as the health and safety of patients and hospital staff. The present invention provides methods of sterilizing comprising contacting the articles, devices or material to be sterilized with a composition of the present invention comprising, or consisting essentially of, E-HFO-1336mzz, and in particular, the blends defined in Table 1, and optionally in combination with one or more additional sterilizing agents.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

While many sterilizing agents are known in the art and are considered to be adaptable for use in connection with the present invention, in certain preferred embodiments sterilizing agent comprises ethylene oxide, formaldehyde, hydrogen peroxide, chlorine dioxide, ozone and combinations of these. In certain embodiments, ethylene oxide is the preferred sterilizing agent. Those skilled in the art, in view of the teachings contained herein, will be able to readily determine the relative proportions of sterilizing agent and the present compound(s) to be used in connection with the present sterilizing compositions and methods, and all such ranges are within the broad scope hereof.

As is known to those skilled in the art, certain sterilizing agents, such as ethylene oxide, are extremely flammable components, and the compound(s) in accordance with the present invention are included in the present compositions in amounts effective, together with other components present in the composition, to reduce the flammability of the sterilizing composition to acceptable levels. The sterilization methods of the present invention may be either high or low-temperature sterilization of the present invention involves the use of a compound or composition of the present invention at a temperature of from about 250° F. to about 270° F., preferably in a substantially sealed chamber. The process can be completed usually in less than about two hours. However, some articles, such as plastic articles and electrical components, cannot withstand such high temperatures and require low-temperature sterilization.

Sterilization Examples

In low temperature sterilization methods, the article to be sterilized is exposed to a fluid comprising, or consisting essentially of, E-HFO-1336mzz at a temperature of from about room temperature to about 200° F., more preferably at a temperature of from about room temperature to about 100° F.

The low-temperature sterilization of the present invention is preferably at least a two-step process performed in a substantially sealed, preferably air tight, chamber. In the first step (the sterilization step), the articles having been cleaned and wrapped in gas permeable bags are placed in the chamber.

Air is then evacuated from the chamber by pulling a vacuum and perhaps by displacing the air with steam. In certain embodiments, it is preferable to inject steam into the chamber to achieve a relative humidity that ranges preferably from about 30% to about 70%. Such humidities may maximize the sterilizing effectiveness of the sterilant, which is introduced into the chamber after the desired relative humidity is achieved. After a period of time sufficient for the sterilant to permeate the wrapping and reach the interstices of the article, the sterilant and steam are evacuated from the chamber.

In the preferred second step of the process (the aeration step), the articles are aerated to remove sterilant residues. Removing such residues is particularly important in the case of toxic sterilants, although it is optional in those cases in which the substantially non-toxic compounds of the present invention are used. Typical aeration processes include air washes, continuous aeration, and a combination of the two. An air wash is a batch process and usually comprises evacuating the chamber for a relatively short period, for example, 12 minutes, and then introducing air at atmospheric pressure or higher into the chamber.

As used herein the term "non-toxic" refers to compounds and compositions of the present invention which have an acute toxicity level substantially less than, and preferably at least about 30 relative percent less than, the toxicity level of HFO-1223xd, as measured by the method published in Anesthesiology, Vol. 14, pp. 466-472, 1953, incorporated here by reference.

This cycle is repeated any number of times until the desired removal of sterilant is achieved. Continuous aeration typically involves introducing air through an inlet at one side of the chamber and then drawing it out through an outlet on the other side of the chamber by applying a slight vacuum to the outlet. Frequently, the two approaches are combined. For example, a common approach involves performing air washes and then an aeration cycle.

Lubricants

In certain preferred embodiments, the compositions of the present invention comprising, or consisting essentially of, E-HFO-1336mzz, and in particular, the blends defined in Table 1, may further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used.

Examples of suitable lubricants include mineral oil, alkyl benzenes, polyol esters, including polyalkylene glycols, PAG oil, PVE, polycarbonate and the like. Mineral oil, which comprises paraffin oil or naphthenic oil, is commercially available. Commercially available mineral oils include Witco LP 250™ from Witco, Zerol 300™ from Shrieve Chemical, Sunisco 3GS from Witco, and Calumet R015 from Calumet. Commercially available alkyl benzene lubricants include Zerol 150™. Commercially available esters include neopentyl glycol dipelargonate which is available as Emery 2917™ and Hatcol 2370™. Other useful esters include phosphate esters, dibasic acid esters, and fluoroesters. Preferred lubricants include polyalkylene glycols and esters. Certain more preferred lubricants include polyalkylene glycols.

Extraction of Flavors and Fragrances

The compositions of the present invention comprising, or consisting essentially of E-HFO-1336mzz, and in particular, the blends as described in Table 1, also provide advantage when used to carry, extract or separate desirable materials from biomass. These materials include, but are not limited to, essential oils such as flavors and fragrances, oils which may be used as fuel, medicinals, nutraceuticals, etc.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

Extraction Example

The suitability of the present compositions for this purpose is demonstrated by a test procedure in which a sample of Jasmone is put into a heavy walled glass tube. A suitable amount of a E-HFO-1336mzz containing composition of the present invention is added to the glass tube. The tube is then frozen and sealed. Upon thawing the tube, when the mixture has one liquid phase containing Jasome and the E-HFO-1336mzz containing composition of this invention; this test establishes the favorable use of the composition as an extractant, carrier or part of delivery system for flavor and fragrance formulations, in aerosol and other formulations. It also establishes its potential as an extractant of flavors and fragrances, including from plant matter.

Flammability Reduction Methods

According to certain other preferred embodiments, the present invention provides methods for reducing the flammability of fluids, said methods comprising adding a E-HFO-1336mzz containing composition, such as the blends defined in Table 1, to said fluid. The flammability associated with any of a wide range of otherwise flammable fluids may be reduced according to the present invention. For example, the flammability associated with fluids such as ethylene oxide, flammable hydrofluorocarbons and hydrocarbons, including: HFC-152a, 1,1,1-trifluoroethane (HFC-143a), difluoromethane (HFC-32), propane, hexane, octane, and the like can be reduced according to the present invention. For the purposes of the present invention, a flammable fluid may be any fluid exhibiting flammability ranges in air as measured via any standard conventional test method, such as ASTM E-681, and the like.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

Any suitable amounts of the present compounds or compositions may be added to reduce flammability of a fluid according to the present invention. As will be recognized by those of skill in the art, the amount added will depend, at least in part, on the degree to which the subject fluid is flammable and the degree to which it is desired to reduce the flammability thereof. In certain preferred embodiments, the amount of compound or composition added to the flammable fluid is effective to render the resulting fluid substantially non-flammable.

Flame Suppression Methods

The present invention further provides methods of suppressing a flame, said methods comprising contacting a flame with a E-HFO-1336mzz containing composition of the present invention, particularly the blends described in Table 1. If desired, additional flame suppressing agents can also be used with the composition of the present invention, either in admixture, or as a secondary flame suppressing agent. One class of compounds for this purpose is the fluoroketones. One especially preferred fluoroketone is dodecafluoro-2-methylpentan-3-one, which is sold by the 3M Company under the trade name Novec 1230.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

Any suitable methods for contacting the flame with the present composition may be used. For example, a composition of the present invention may be sprayed, poured, and the like onto the flame, or at least a portion of the flame may be immersed in the composition.

Flame Suppression Example

This example demonstrates the use of the compositions comprising, or consisting essentially of E-HFO-1336mzz, and in particular, the blends as described in Table 1, for use as a flame suppression composition.

For this use, the amount of the compound E-HFO-1336mzz in the composition of the invention can be in accordance with the following ranges: from about 1 wt % to about 99 wt %; from about 30 wt % to about 99 wt %; from about 50 wt % to about 99 wt %; from about 75 wt % to about 99 wt %; from about 85 wt % to about 99 wt %; from about 20 wt % to about 80 wt %; from about 90 wt % to about 99 wt %; from about 95 wt % to about 99 wt %; from about 1 wt % to about 20 wt %; from about 1 wt % to about 40 wt %; from about 1 wt % to about 50 wt %; from about 5 wt % to about 20 wt %; from about 5 wt % to about 40 wt %; from about 5 wt % to about 60 wt %; from about 10 wt % to about 80 wt %; from about 10 wt % to about 90 wt %; from about 20 wt % to about 80 wt %; from about 20 wt % to about 90 wt %. Other ranges of amounts are shown in Table 1, and those amounts are likewise applicable for this use of the composition of the invention.

To evaluate total flooding fire suppression applications the NFPA 2001 cup burner was used. Here a small fire of the fuel of interest is located in a chimney which has air flowing around the flame to supply the needed oxygen. To this air stream E-HFO-1336mzz is added until the flame is extinguished. Table 9 shows the extinguishing concentrations for several fuels using E-HFO-1336mzz as the fire extinguishant.

TABLE 9

Flame Extinguishment by E-HFO-1336mzz

| Fuel | % E-HFO-1336mzz for Flame Extinguishment |
|---|---|
| heptane | 7.0 |
| methanol | 10.4 |
| acetone | 6.9 |

While the present invention has been particularly shown and described with reference to preferred embodiments, it will be readily appreciated by those of ordinary skill in the art that various changes and modifications may be made without departing from the scope of the invention. It is intended that the claims be interpreted to cover the disclosed embodiment, those alternatives which have been discussed above and all equivalents thereto.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

As used herein, the phrase "consisting essentially of" is intended to cover a partially exclusive inclusion. For example, a composition, method, process or apparatus that consists essentially of elements is not limited to only those elements, but may only include other elements that do not materially change the intended advantageous properties of the composition, method, process or apparatus.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited In case of conflict, the present specification, including definitions, will control. In addition, the materials, methods, and examples are illustrative only and not intended to be limiting.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

Example 4

Phase Studies of Mixture of E-1336mzz and Cyclopentane

A phase study was performed for a composition consisting essentially of E-1336mzz and cyclopentane, wherein the composition was varied and the vapor pressures were measured at 29.89° C. Based upon the data from the phase studies, azeotropic compositions at other temperature and pressures have been calculated.

Table 10 provides a compilation of experimental and calculated azeotropic compositions for E-1336mzz and cyclopentane at specified temperatures and pressures.

TABLE 10

| Temperature ° C. | Pressure psia | Mole % E-1336mzz | Mole % cyclopentane |
|---|---|---|---|
| −40 | 1.43 | 90.30% | 9.70% |
| −30 | 2.57 | 89.89% | 10.11% |
| −20 | 4.39 | 89.66% | 10.34% |
| −10 | 7.14 | 89.63% | 10.37% |
| 0 | 11.11 | 89.81% | 10.19% |
| 10 | 16.65 | 90.25% | 9.75% |
| 20 | 24.16 | 90.96% | 9.04% |
| 30 | 34.05 | 92.00% | 8.00% |
| 40 | 46.81 | 93.42% | 6.58% |
| 50 | 62.96 | 95.31% | 4.69% |
| 60 | 83.12 | 97.76% | 2.24% |
| 70 | 108.03 | 100.00% | 0 |

Example 5

Example 2 demonstrates dew point and bubble point vapor pressures for mixtures of E-1336mzz and cyclopentane.

The dew point and bubble point vapor pressures for compositions disclosed herein were calculated from measured and calculated thermodynamic properties. The near-azeotrope range is indicated by the minimum and maximum concentration of E-1336mzz and cyclopentane (mole percent, mol %) for which the difference in dew point and bubble point pressures is less than or equal to 3% (based upon bubble point pressure). The results are summarized in Table 11.

TABLE 11

| Temperature, ° C. | Azeotrope composition, mol % E-1336mzz | Near azeotrope compositions, mol % E-1336mzz Minimum | Maximum |
|---|---|---|---|
| −40 | 90.3 | 88.0 | 99.8 |
| −20 | 89.7 | 85.8 | 99.8 |
| 0 | 89.8 | 84.2 | 99.8 |
| 20 | 91.0 | 83.0 | 99.8 |
| 29.89 | 92.0 | 82.6 | 99.8 |
| 40 | 93.4 | 82.4 | 99.8 |
| 60 | 97.8 | 82.6 | 99.8 |
| 80 | — | 83.6 | 99.8 |
| 100 | — | 85.6 | 99.8 |

Example 6

The chemical stability of E-HFO-1336mzz in the presence of metals was tested according to the sealed tube testing methodology of ANSI/ASHRAE Standard 97-2007. The stock of E-HFO-1336mzz used in the sealed tube tests contained virtually no water or air. Sealed glass tubes, each containing three metal coupons made of steel, copper, and aluminum immersed in E-HFO-1336mzz, were aged in a heated oven at 175° C., 225° C. and 250° C. for 14 days. Visual inspection of the tubes after thermal aging indicated clear liquids with no discoloration or other visible deterioration of the fluid. The concentration of fluoride ion in the aged liquid samples, measured by ion chromatography, was below detection limit (3 ppm) even after two weeks of aging at 250° C. The concentration of fluoride ion can be interpreted as an indicator of the degree of E-HFO-1336mzz degradation. Therefore, E-HFO-1336mzz degradation was minimal. Gas chromatography (GC) analyses of the E-HFO-1336mzz samples after aging for 14 days at 175° C., 225° C. and 250° C. indicated negligible chemical conversion of E-HFO-1336mzz and negligible formation of new compounds.

What is claimed is:

1. A composition, comprising trans-1,1,1,4,4,4-hexafluoro-2-butene and 1,1-difluoroethane (R-152a), wherein said trans-1,1,1,4,4,4-hexafluoro-2-butene is present at a concentration of 1-99 wt %.

2. The composition of claim 1, wherein the trans-1,1,1,4,4,4-hexafluoro-2-butene is present at a concentration of 1-40 wt %.

3. The composition of claim 1, wherein the trans-1,1,1,4,4,4-hexafluoro-2-butene is present at a concentration of 1-50 wt %.

4. The composition of claim 1, wherein said trans-1,1,1,4,4,4-hexafluoro-2-butene is present in a concentration of 5-20 wt %.

5. The composition of claim 1, wherein said trans-1,1,1,4,4,4-hexafluoro-2-butene is present in a concentration of 5-40 wt %.

6. The composition of claim 1, wherein said trans-1,1,1,4,4,4-hexafluoro-2-butene is present in a concentration of 5-60 wt %.

7. The composition of claim 1, wherein said trans-1,1,1,4,4,4-hexafluoro-2-butene is present in a concentration of 10-80 wt %.

8. The composition of claim 1, wherein said trans-1,1,1,4,4,4-hexafluoro-2-butene is present in a concentration of 10-90 wt %.

9. The composition of claim 1, wherein said trans-1,1,1,4,4,4-hexafluoro-2-butene is present in a concentration of 20-80 wt %.

10. The composition of claim 1, wherein said trans-1,1,1,4,4,4-hexafluoro-2-butene is present in a concentration of 20-90 wt %.

11. The composition of claim 1, wherein said trans-1,1,1,4,4,4-hexafluoro-2-butene is present in a concentration of 75-99 wt %.

12. The composition of claim 1, wherein said trans-1,1,1,4,4,4-hexafluoro-2-butene is present in a concentration of 85-99 wt %.

13. The composition of claim 1, wherein said trans-1,1,1,4,4,4-hexafluoro-2-butene is present in a concentration of at least 50 wt %.

14. The composition of claim 1, wherein said trans-1,1,1,4,4,4-hexafluoro-2-butene is present in a concentration of at least 70 wt %.

15. The composition of claim 1, wherein said trans-1,1,1,4,4,4-hexafluoro-2-butene is present in a concentration of 90-99 wt %.

16. The composition of claim 1, wherein said trans-1,1,1,4,4,4-hexafluoro-2-butene is present in a concentration of 95-99 wt %.

17. The composition of claim 1, wherein said 1,1-difluoroethane (R-152a) is present in a concentration of 1-99 wt %.

18. The composition of claim 1, wherein said 1,1-difluoroethane (R-152a) is present in a concentration of 5-95 wt %.

19. The composition of claim 1, wherein said 1,1-difluoroethane (R-152a) is present in a concentration of 10-90 wt %.

20. The composition of claim 1, wherein said 1,1-difluoroethane (R-152a) is present in a concentration of 25-75 wt %.

21. The composition of claim 1, wherein said 1,1-difluoroethane (R-152a) is present in a concentration of 40-60 wt %.

22. The composition of claim 1, wherein said 1,1-difluoroethane (R-152a) is present in a concentration of 45-55 wt %.

23. The composition of claim 1, wherein said 1,1-difluoroethane (R-152a) is present in a concentration of about 50 wt %.

24. A process of forming a foam comprising the steps of:
adding a foamable composition to a blowing agent; and
reacting said foamable composition under conditions effective to form a foam, wherein said blowing agent comprises the composition according to claim 9.

25. A pre-mix composition comprising a foamable component and a blowing agent, said blowing agent comprising the composition according to claim 9.

26. A process for producing refrigeration comprising the steps of condensing the composition according to claim 1 and evaporating said composition in the vicinity of a body to be cooled.

27. An aerosol product comprising a component to be dispensed and a propellant, wherein said propellant comprises the composition according to claim 1.

* * * * *